(12) United States Patent
Versteeg et al.

(10) Patent No.: US 10,031,836 B2
(45) Date of Patent: Jul. 24, 2018

(54) SYSTEMS AND METHODS FOR AUTOMATICALLY GENERATING MESSAGE PROTOTYPES FOR ACCURATE AND EFFICIENT OPAQUE SERVICE EMULATION

(71) Applicant: CA, INC., New York, NY (US)

(72) Inventors: Steven Cornelis Versteeg, Hawthorn (AU); Miao Du, Mitcham (AU); Jean-Guy Schneider, Hawthorn (AU); John Collis Grundy, Diamond Creek (AU); Jun Han, Vermont South (AU)

(73) Assignee: CA, INC., New York, NY (US)

( * ) Notice: Subject to any disclaimer, the term of this patent is extended or adjusted under 35 U.S.C. 154(b) by 540 days.

(21) Appl. No.: 14/535,950

(22) Filed: Nov. 7, 2014

(65) Prior Publication Data

US 2015/0363215 A1 Dec. 17, 2015

Related U.S. Application Data

(63) Continuation-in-part of application No. 14/305,322, filed on Jun. 16, 2014.

(51) Int. Cl.
G06F 11/36 (2006.01)

(52) U.S. Cl.
CPC ...... *G06F 11/3664* (2013.01); *G06F 11/3684* (2013.01)

(58) Field of Classification Search
CPC ............. G06F 11/3664; G06F 11/3684; G06F 17/30705
See application file for complete search history.

(56) References Cited

U.S. PATENT DOCUMENTS

| | | | |
|---|---|---|---|
| 7,069,305 B2 * | 6/2006 | Serizawa | H04L 67/1097 709/211 |
| 7,146,381 B1 * | 12/2006 | Allen | G06F 17/2705 |
| 7,434,205 B1 * | 10/2008 | Steenhagen | G06F 8/20 717/105 |

(Continued)

OTHER PUBLICATIONS

Miao Du, Automatic Generation of Interaction Models for Enterprise Software Environment Emulaiton, Jun. 4, 2013, ASWEC 2013, p. 1-4.*

(Continued)

*Primary Examiner* — Aniss Chad
*Assistant Examiner* — Chuen-Meei Gan
(74) *Attorney, Agent, or Firm* — Sage Patent Group

(57) ABSTRACT

In a method of service emulation, a plurality of messages communicated between a system under test and a target system for emulation are recorded in a computer-readable memory. Ones of the messages are clustered to define a plurality of message clusters, and respective cluster prototypes are generated for the message clusters. The respective cluster prototypes include a commonality among the ones of the messages of the corresponding message clusters. One of the message clusters is identified as corresponding to a request from the system under test based on a comparison of the request with the respective cluster prototypes, and a response to the request for transmission to the system under test is generated based on the one of the message clusters that was identified. Related computer systems and computer program products are also discussed.

16 Claims, 10 Drawing Sheets

(56) References Cited

U.S. PATENT DOCUMENTS

| | | | |
|---|---|---|---|
| 7,689,610 B2 | 3/2010 | Bansal et al. | |
| 7,729,256 B2 | 6/2010 | Malloy et al. | |
| 8,418,000 B1* | 4/2013 | Salame | G06F 11/079 714/26 |
| 8,589,140 B1* | 11/2013 | Poulin | G06F 11/3457 463/42 |
| 8,849,931 B2* | 9/2014 | Linner | G06F 17/2765 707/755 |
| 8,874,428 B2* | 10/2014 | Huerta | G06F 17/2836 704/2 |
| 8,949,177 B2 | 2/2015 | Chen et al. | |
| 9,336,302 B1* | 5/2016 | Swamy | G06F 17/3071 |
| 9,544,373 B2 | 1/2017 | Poletto et al. | |
| 9,582,399 B2 | 2/2017 | Versteeg et al. | |
| 2002/0165838 A1* | 11/2002 | Vetter | G06F 11/3447 706/20 |
| 2002/0168966 A1* | 11/2002 | Tillier | H04L 67/34 455/412.1 |
| 2002/0198722 A1* | 12/2002 | Yuschik | G10L 15/1822 704/275 |
| 2004/0006742 A1* | 1/2004 | Slocombe | G06F 17/2205 715/234 |
| 2005/0015366 A1* | 1/2005 | Carrasco | G06F 17/30675 |
| 2008/0077570 A1* | 3/2008 | Tang | G06F 17/30684 |
| 2008/0216059 A1* | 9/2008 | Moudgal | H04L 67/02 717/134 |
| 2009/0106256 A1* | 4/2009 | Safari | G06F 11/1433 |
| 2009/0228576 A1* | 9/2009 | Rosenan | G06F 11/3664 709/221 |
| 2009/0276191 A1* | 11/2009 | Bell, Jr. | G01R 31/318357 703/1 |
| 2010/0146487 A1* | 6/2010 | Chun | G06F 11/3688 717/126 |
| 2011/0161063 A1* | 6/2011 | Pye | G06F 11/3664 703/13 |
| 2011/0176441 A1* | 7/2011 | Matsuoka | G06F 11/3409 370/252 |
| 2011/0185234 A1* | 7/2011 | Cohen | G06F 11/3476 714/37 |
| 2011/0289086 A1* | 11/2011 | Jordan | G06F 17/30303 707/737 |
| 2012/0328187 A1* | 12/2012 | Vuleta | G06F 17/211 382/164 |
| 2013/0311827 A1* | 11/2013 | Drory | G06F 11/3664 714/32 |
| 2013/0326276 A1* | 12/2013 | Hu | G06F 11/26 714/37 |
| 2013/0339931 A1* | 12/2013 | Rode | G06F 11/261 717/128 |
| 2013/0346377 A1* | 12/2013 | Barnett | H04L 41/147 707/692 |
| 2014/0026123 A1* | 1/2014 | Dhanapal | G06F 11/3664 717/124 |
| 2014/0100865 A1 | 4/2014 | Beaton et al. | |
| 2014/0108001 A1* | 4/2014 | Brown | G06F 11/3664 703/23 |
| 2014/0129694 A1 | 5/2014 | Aoun et al. | |
| 2014/0136667 A1* | 5/2014 | Gonsalves | G06F 11/3664 709/221 |
| 2014/0223418 A1* | 8/2014 | Michelsen | G06F 11/3696 717/135 |
| 2014/0325486 A1* | 10/2014 | Zhang | G06F 11/3692 717/125 |
| 2015/0331853 A1 | 11/2015 | Palmonari et al. | |
| 2016/0224652 A1 | 8/2016 | Schwartz et al. | |
| 2016/0277510 A1* | 9/2016 | Du | H04L 43/50 |

OTHER PUBLICATIONS

Cameron Hine et al, Scalable emulation of enterprise systems, 2009 IEEE, ASWEC 2009, p. 142-151.*

Steve Verteeg et al, Emulation of cloud-scale environments for scalability testing, 2012 IEEE, 12th international conference on quality software, p. 201-209.*

Du et al. "From Network Traces to System Responses: Opaquely Emulating Software Services", Technical Report. Swinburne University of Technology, Faculty of Information and Technology, Submitted Oct. 6, 2015.

Du et al.; "Generating Service Models by Trace Subsequence Substitution"; QoSA'13, Jun. 17-21, 2013, Vancouver, BC, Canada, Copyright 2013 ACM 978-1-4503-2126-6/13/06; 10 pages.

Du, Miao; "Automatic Generation of Interaction Models for Enterprise Software Environment Emulation"; Australasian Software Engineering Conference 2013 (AWEC2013), PhD Symposium; Jun. 4, 2013; 4 pages.

Du et al.; "Interaction Traces Mining for Efficient System Responses Generation"; published in a paper at the 2nd International Workshop on Software Mining (SoftMine), Nov. 11, 2013; 8 pages.

* cited by examiner

TRANSFORM NETWORK DATA TO TEXT FORMAT

```
Index
1: addRequest(36) "cn=Miao DU, ou=
administration, ou=Corporate,
o=DEMOCORP, c=AU"
2: searchRequest(147) "cn=Alfred FITZGERALD,
ou=Legal, ou=Corporate, o=DEMOCORP, c=AU"
baseObject
...
5: addRequest(171) "cn=Debbie DALLY,
ou=Finance, ou=Corporate,o=DEMOCORP,c=AU"
...
8: searchRequest(159) "cn=Barbara HARTLEY,
ou=Management, ou=Corporate, o=DEMOCORP,
c=AU" baseObject
```

*FIG. 4A*

BUILD MESSAGES DISTANCE MATRIX 0.0000 0.2168 ... 0.1227 0.2111
0.2168 0.0000 ... 0.1860 0.1410
... ... ... ... ...
0.1227 0.1860 ... 0.0000 0.1806
0.2111 0.1410 ... 0.1806 0.0000

⇩ DISTANCE MATRIX IMAGE

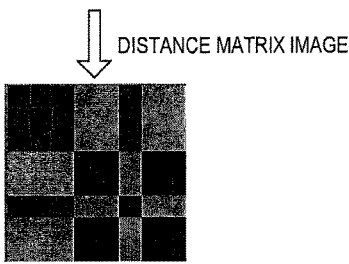

*FIG. 4B*

CLUSTER MESSAGES 0.0000 0.2168 ... 0.1860 0.1410
0.2168 0.0000 ... 0.1227 0.2111
... ... ... ... ...
0.1860 0.1227 ... 0.0000 0.1806
0.1410 0.2111 ... 0.1806 0.0000

⇩ DISTANCE MATRIX IMAGE

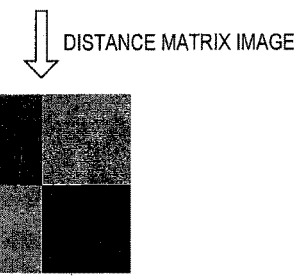

*FIG. 4C*

EXPORT CLUSTERS 0.0000 0.2168 ...     ...     ...
0.2168 0.0000 ...     ...  0.0000 0.1806
 ...    ...   ...     ...  0.1806 0.0000

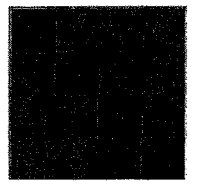

*FIG. 4D*

CLUSTER CENTER SELECTION addRequest ...            searchRequest ...

*FIG. 4E*

SYSTEMS AND METHODS FOR AUTOMATICALLY GENERATING MESSAGE PROTOTYPES FOR ACCURATE AND EFFICIENT OPAQUE SERVICE EMULATION

RELATED APPLICATIONS

The present application is a continuation-in-part of U.S. patent application Ser. No. 14/305,322 entitled "SYSTEMS AND METHODS FOR CLUSTERING TRACE MESSAGES FOR EFFICIENT OPAQUE RESPONSE GENERATION," filed Jun. 16, 2014, the disclosure of which is incorporated by reference herein in its entirety.

BACKGROUND

Various embodiments described herein relate to computer systems, methods and program products and, more particularly, to virtualized computer systems, methods and computer program products.

Modern enterprise software environments may integrate a large number of software systems to facilitate complex business processes. Many of these software systems may interact with and/or rely on services provided by other systems (e.g., third-party systems or services) in order to perform their functionalities or otherwise fulfill their responsibilities, and thus, can be referred to as "systems of systems." For example, some enterprise-grade identity management suites may support management and provisioning of users, identities, and roles in large organizations across a spectrum of different endpoint systems. Such systems can be deployed into large corporations, such as banks and telecommunications providers, who may use it to manage the digital identities of personnel and to control access of their vast and distributed computational resources and services.

Assuring the quality of such software systems (including the functionality which interacts with third-party systems or services) before deployment into actual production environments (i.e., "live" deployment) may present challenges, for example, where the systems interoperate across heterogeneous services provided by large scale environments. For example, physical replication and provisioning of real-world deployment environments can become difficult to effectively manage or even achieve, as recreating the heterogeneity and massive scale of typical production environments (often with thousands of real client and server hardware platforms, suitably configured networks, and appropriately configured software applications for the system under test to communicate with) may be difficult given the resources of a quality assurance (QA) team. Accessing these environments may also involve difficulty and/or expense, and the different environment configurations may affect the operational behavior of such software systems. For example, access to real third party services during testing may be restricted, expensive, and/or unavailable at a scale that is representative of the production environment. Thus, due to the complex interaction between a software system and its operating environment, traditional standalone-system-oriented testing techniques may be inadequate for quality assurance.

Enterprise software environment emulation may be used as an alternative approach to providing interactive representations of operating environments. Software service emulation (or "service virtualization") may refer to emulation of the behavior of specific components in heterogeneous component-based environments or applications, such as Application Programming Interface (API)-driven applications, cloud-based applications and/or service-oriented architectures. Service virtualization allows the communication between a client and software service to be virtualized, such that the virtual service can respond to requests from the client system with generated responses. With the behavior of the components or endpoints simulated by a model or "virtual asset" (which stands in for a component by listening for requests and returning an appropriate response), testing and development can proceed without accessing the actual live components of the system under test. For instance, instead of virtualizing an entire database (and performing all associated test data management as well as setting up the database for every test session), the interaction of an application with the database may be monitored, and the related database behavior may be emulated (e.g., Structured Query Language (SQL) queries that are passed to the database may be monitored, and the associated result sets may be returned, and so forth). For a web service, this might involve listening for extensible markup language (XML) messages over hypertext transfer protocol (HTTP), Java® message service (JMS), or IBM® Web Sphere MQ, then returning another XML message. Thus, the virtual asset's functionality and performance may reflect the functionality/performance of the actual component, and/or may simulate conditions (such as extreme loads or error conditions) to determine how an application or system under test responds under those circumstances.

By modeling the interaction behavior of individual systems in an environment and subsequently simultaneously executing a number of those models, an enterprise software environment emulator can provide an interactive representation of an environment which, from the perspective of an external software system, appears to be a real or actual operating environment. Manually defining interaction models may offer advantage in defining complex sequences of request/response patterns between elements of the system including suitable parameter values. However, in some cases, such an approach may not be feasible due to the time required or lack of required expertise. In particular, manually defining interaction models (including complex sequences of request/response patterns and suitable parameter values) may require knowledge of the underlying interaction protocol(s) and system behavior(s). Such information may often be unavailable at the required level of detail (if at all), for instance, when third-party, legacy, and/or mainframe systems are involved. Additionally, the large number of components and component interactions in such systems may make manual approaches time-consuming and/or error-prone. Also, due to lack of control over the environment, if an environment changes with new enterprise elements or communication between elements, these manual protocol specifications must be further updated.

BRIEF SUMMARY

According to some embodiments, in a method of service emulation, a plurality of messages communicated between a system under test and a target system for emulation are recorded in a computer-readable memory. Ones of the messages are clustered to define a plurality of message clusters, and respective cluster prototypes are generated for the message clusters. The respective cluster prototypes include a commonality among the ones of the messages of the corresponding message clusters. One of the message clusters is identified as corresponding to a request from the system under test based on a comparison of the request with the respective cluster prototypes, and a response to the request for transmission to the system under test is generated based on the one of the message clusters that was identified. The recordation of the messages, the clustering of the messages, the generation of the respective cluster prototypes, the identification of the one of the message clusters, and the generation of the response are performed by a processor coupled to the memory.

In some embodiments, for the respective cluster prototypes, the commonality may include common characters that are selected based on a frequency of occurrence at respective positions of the ones of the messages of the corresponding message clusters.

In some embodiments, in generating the respective cluster prototypes, the ones of the messages of the corresponding message clusters may be aligned according to the respective positions, and the common characters may be identified based on the frequency of occurrence at the respective positions indicated by the aligning.

In some embodiments, in aligning the messages, gap characters may be inserted among the ones of the messages of the corresponding message clusters to align the common characters at the respective positions. In generating the respective cluster prototypes, a sequence including the common characters may be extracted from the ones of the messages of the corresponding message clusters responsive to the aligning.

In some embodiments, for the respective cluster prototypes, in extracting the sequence, a lack of consensus may be determined based on the frequency of occurrence at the respective positions, and wildcard characters may be inserted into the sequence at the respective positions to indicate the lack of consensus.

In some embodiments, for the respective cluster prototypes, the common characters may be inserted into the sequence based on the frequency of occurrence at the respective positions being above a threshold, and the wildcard characters may be inserted into the sequence based on the frequency of occurrence at the respective positions being below the threshold. The sequence including the common characters may further include ones of the gap characters, and the ones of the gap characters may be deleted from the sequence for the respective cluster prototypes.

In some embodiments, respective positions of the respective cluster prototypes may be identified as corresponding to respective information types based on a relative variability of the respective positions of the ones of the messages of the corresponding message clusters. Different weightings may be assigned to the respective positions of the respective cluster prototypes according to the respective information types. For example, ones of the respective positions of the respective cluster prototypes having a lower relative variability (which may correspond to operation types, which may be more stable than payloads) may be assigned higher ones of the different weightings.

In some embodiments, in identifying the one of the message clusters as corresponding to the request from the system under test, a similarity of the request to the respective cluster prototypes may be calculated based on the different weightings assigned to the respective positions thereof and a runtime distance measure that is independent of a message structure of the request. The one of the message clusters may be identified as corresponding to the request based on the similarity of the request to a corresponding one of the cluster prototypes.

In some embodiments, the runtime distance measure may be normalized to account for alignment of respective positions of the request with the wildcard characters in the respective cluster prototypes.

In some embodiments, the ones of the messages of the message clusters may be respective requests and responses associated therewith communicated between the system under test and the target system. In generating the response, one of the requests of the one of the message clusters that was identified may be selected. Respective fields in the one of the requests and in one of the respective responses associated therewith may be identified as including a common subsequence, and a field in the one of the respective responses may be populated with a subsequence from the request from the system under test based on the respective fields that were identified.

According to further embodiments, a computer system, includes a processor, and a memory coupled to the processor. The memory includes computer readable program code embodied therein that, when executed by the processor, causes the processor to record a plurality of messages communicated between a system under test and a target system for emulation in a computer-readable memory, cluster ones of the messages to define a plurality of message clusters, and generate respective cluster prototypes for the message clusters. The respective cluster prototypes include a commonality among the ones of the messages of the corresponding message clusters. The memory further includes computer readable program code embodied therein that, when executed by the processor, causes the processor to identify one of the message clusters as corresponding to a request from the system under test based on a comparison of the request with the respective cluster prototypes, and generate a response to the request for transmission to the system under test based on the one of the message clusters that was identified.

In some embodiments, for the respective cluster prototypes, the commonality may be common characters that are selected based on a frequency of occurrence at respective positions of the ones of the messages of the corresponding message clusters.

In some embodiments, to generate the respective cluster prototypes, the computer readable program code, when executed by the processor, may further cause the processor to align the ones of the messages of the corresponding message clusters according to the respective positions, and identify the common characters based on the frequency of occurrence at the respective positions indicated by alignment thereof.

In some embodiments, to align the ones of the messages, the computer readable program code, when executed by the processor, may further cause the processor to insert gap characters among the ones of the messages of the corresponding message clusters to align the common characters at the respective positions. To generate the respective cluster prototypes, the computer readable program code, when executed by the processor, may further cause the processor to extract a sequence including the common characters from the ones of the messages of the corresponding message clusters responsive to the alignment thereof.

In some embodiments, to extract the sequence for the respective cluster prototypes, the computer readable program code, when executed by the processor, may further cause the processor to determine a lack of consensus based on the frequency of occurrence at the respective positions; and insert wildcard characters into the sequence responsive to determining the lack of consensus.

In some embodiments, to extract the sequence for the respective cluster prototypes, the computer readable program code, when executed by the processor, may further cause the processor to insert the common characters into the sequence based on the frequency of occurrence at the respective positions being above a threshold, and insert the wildcard characters into the sequence based on the frequency of occurrence at the respective positions being below the threshold.

In some embodiments, the sequence including the common characters may further include ones of the gap characters. To extract the sequence for the respective cluster prototypes, the computer readable program code, when executed by the processor, may further cause the processor to delete the ones of the gap characters from the sequence.

According to still further embodiments, a computer program product includes a computer readable storage medium having computer readable program code embodied in the medium. The computer readable program code includes computer readable code to record a plurality of messages communicated between a system under test and a target system for emulation in a computer-readable memory, computer readable code to cluster ones of the messages to define a plurality of message clusters, and computer readable code to generate respective cluster prototypes for the message clusters. The respective cluster prototypes include a commonality among the ones of the messages of the corresponding message clusters. The computer readable program code further includes computer readable code to identify one of the message clusters as corresponding to a request from the system under test based on a comparison of the request with the respective cluster prototypes, and computer readable code to generate a response to the request for transmission to the system under test based on the one of the message clusters that was identified.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

FIGS. 4A-4E are diagrams illustrating message analysis for clustering operations in accordance with some embodiments of the present disclosure.

DETAILED DESCRIPTION

Figure 1:
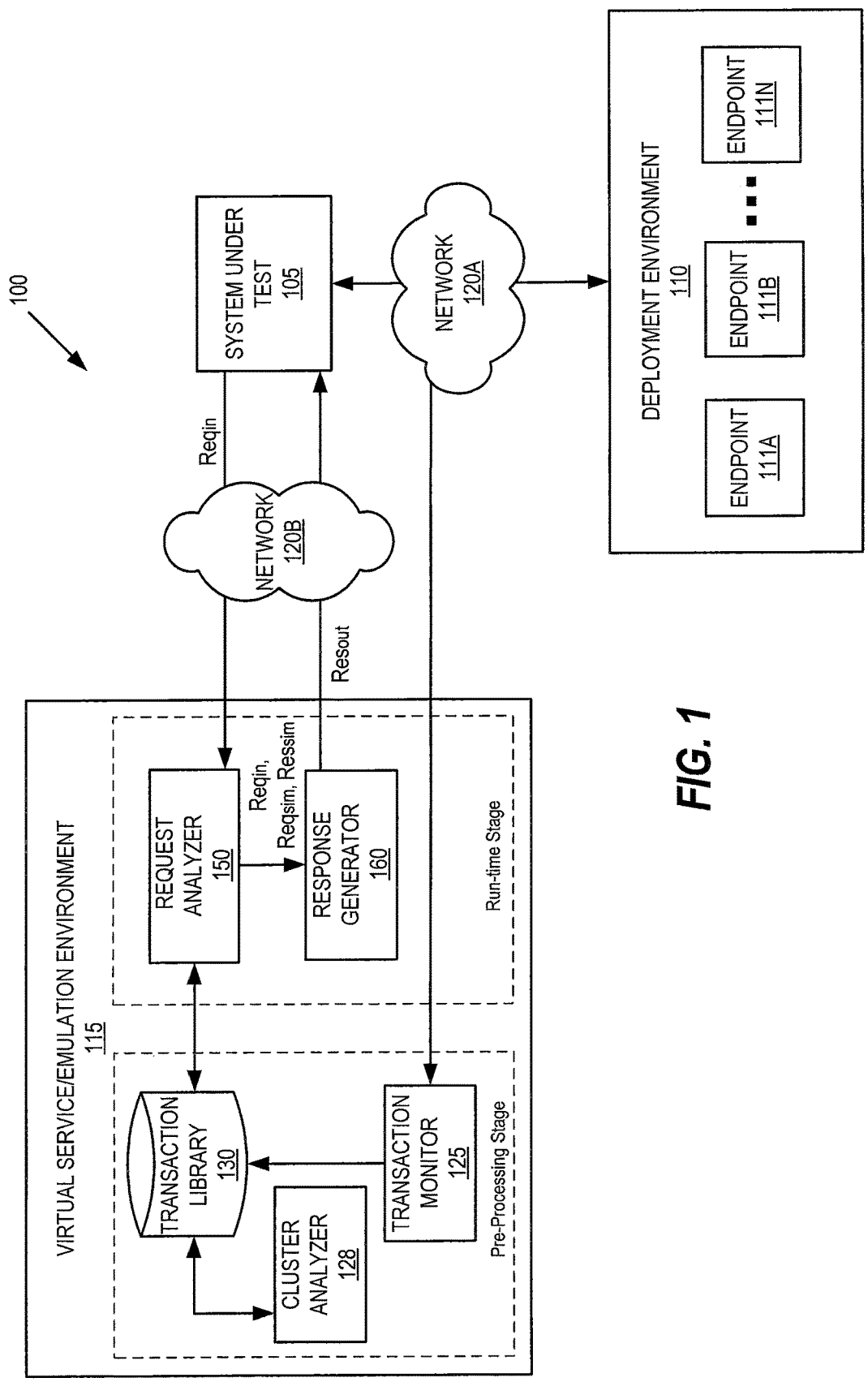
FIG. 1 is a block diagram of a computing system or environment for service emulation in accordance with some embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or environment may include one or more hosts, operating systems, peripherals, and/or applications. Machines in a same computing system or environment may have shared memory or resources, may be associated with the same or different hardware platforms, and/or may be located in the same or different physical locations. Computing systems/environments described herein may refer to a virtualized environment (such as a cloud environment) and/or a physical environment.

In assuring quality of a system under test (for example, a large enterprise system), physical replication of real-world deployment environments may be difficult or impossible to achieve. Thus, an emulation environment where realistic interactive models of the third party services are executed may be useful for purposes of quality assurance and/or development and operations (DevOps). While hardware virtualization tools (such as VMware and VirtualBox) may be capable of replicating specific facets of deployment environments using virtual machines (i.e., software implementations that emulate the architecture and/or program execution of the underlying physical machines), such virtualization tools may have similar scalability limitations as physical recreation of deployment environments (for instance, a virtual CPU-to-physical core ratio on the order of ten to one or less may be required). Mock objects may be used to mitigate some of the scalability concerns, but may be too language-specific and/or may require re-implementation of some of an environment's functionality, which may result in testing environment configuration and maintenance problems and/or may require detailed knowledge of environment components. Performance and load testing tools may allow for emulation of thousands of software system clients with limited resources; however, such tools are typically designed to generate scalable client load towards a target system, rather than the system under test to environment load scaling that is typically helpful in testing enterprise systems.

Figure 8:
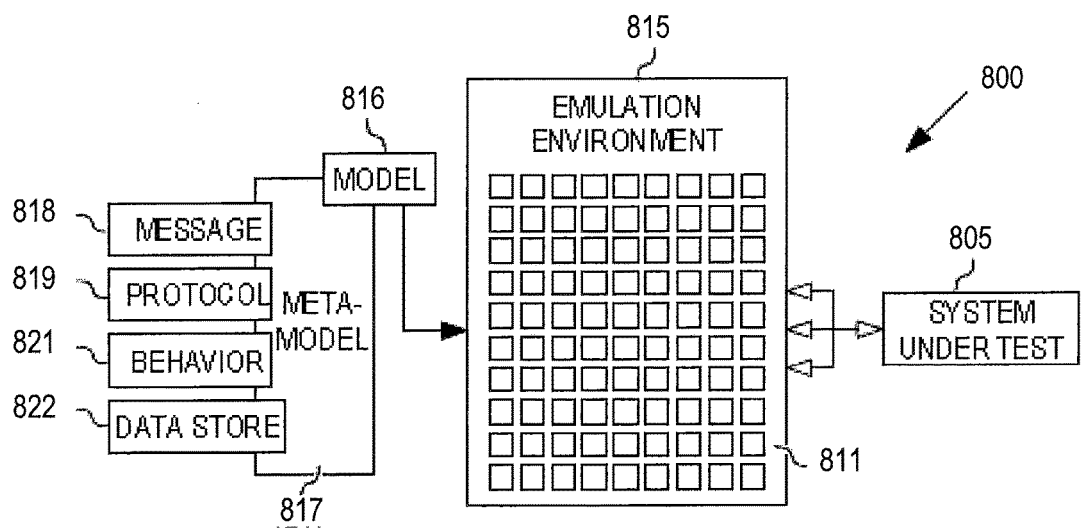
FIG. 8 is a block diagram illustrating an example computing system or environment for service emulation.

As such, emulated or "virtual" deployment environments may be used to provision representations of diverse components, as shown in the environment 800 of FIG. 8. Such an environment 800 may allow a system under test 805 to interact with a large-scale heterogeneous emulation environment 815, which can be provided by a software environment emulator. The emulation environment 815 is capable of simultaneously emulating multiple (e.g. on the order of hundreds or thousands) endpoint systems 811 on one or more physical machines, and may employ scalable models 816 to allow for scalability and performance testing. The models 816 may be created from meta models 817, which may be constructed from messages 818, protocols 819, behavior 821, and/or data store(s) 822.

However, in some instances, scaling of the environment 815 to handle the number of likely endpoints 811 in the deployment scenario may require pre-existing knowledge of (i) a likely maximum number of endpoints; (ii) the likely maximum number of messages between endpoint and system; (iii) the likely frequency of message sends/receives needed for the system to respond in acceptable timeframe; (iv) the likely size of message payloads given deployment network latency and bandwidth; and/or (v) the system's robustness in the presence of invalid messages, too-slow response from end-points, or no-response from endpoints. Also, messages being exchanged between the system under test 805 and the endpoints 811 should adhere to various protocols; for example, a Lightweight Directory Access Protocol (LDAP) message sent by the system under test 805 to an endpoint 811 should be responded to with a suitable response message in reply, in an acceptable timeframe and with acceptable message payload. Subsequent messages sent by the system under test 805 to the endpoint using the LDAP response message payload may also need to utilize the previous response information. As such, the creation of such executable endpoint models 811 may require the availability of a precise specification and/or prior detailed knowledge of the interaction protocols 819 used, may be relatively time consuming and/or error-prone, and may be subject to considerable implementation and/or maintenance effort in heterogeneous deployment environments.

Protocol reverse engineering may be used to determine such interaction protocols 819. By analyzing a large amount of packets and traces captured on networks, structure information of the target protocol may be obtained for network analysis and even automatically reverse engineering the state-machine model of network protocols. For example, an emulator may be used to mimic client- and/or server-side behaviors. With the emulator, the interactions of web applications may be recorded and replayed to ensure conformance of web server behaviors.

LISA® is a commercial service virtualization software product which can emulate the behavior of services with which a system under test interacts in its deployment environment, by mimicking responses that an actual service would produce in response to receiving a request from the enterprise system under test. After recording a set of actual interactive message exchanges (including requests and responses; also referred to herein as interaction traces or message transactions) between a system under test and an endpoint in a transaction library (also referred to as a service image), LISA can use the stored interactions to produce responses to further requests, thus behaving as a 'virtual' service. LISA may consider the interaction state when sending a response, and may use field substitution in the responses for fields that are detected as identical in the request and response. However, for the modeling to be effective, LISA may require information regarding the transport protocol and/or the service protocol (or other specification of the message structure) to be known in advance of the recording. In other words, prior knowledge of the service protocol and/or message structure may be required.

Software service emulation as described herein can create realistic executable models of server-side behavior, thereby replicating production-like conditions for large-scale enterprise software systems. Some embodiments of the present disclosure are directed to a service emulation or virtualization approach that is configured to deduce or infer enterprise system element interaction behavior (agnostic to or without pre-existing knowledge of protocols or message structures) by monitoring and mining message transactions (also referred to as interaction traces) communicated between a system under test and endpoint or elements/components in its deployment environment, to automatically build a transaction database or library indicative of client-server and/or server-server interactions.

More particularly, responsive to receiving an incoming request from a system under test, embodiments of the present disclosure (i) search for a suitably similar request in the previously recorded transactions (including requests and responses) stored in the transaction library, (ii) identify commonalities and differences between the incoming request and the previously-recorded messages (or messages representative thereof), and (iii) generate a response based on one(s) of the previously recorded responses associated with the previously recorded request(s) having the identified commonalties and differences. Longest common subsequence matching and field substitution may also be used to implement a distance function and a translation function, respectively, to generate the response to the incoming request. For example, given an incoming request to a modeled service, the distance function may be used to search for the most similar request in the previously recorded interaction traces by computing their distances, and the translation function may be
    used to synthesize a valid response.

Various embodiments described herein can thus provide service emulation or virtualization methods, systems, and/or computer program products that simulate the behavior of a target environment responsive to a request from a system under test, by building a library of previous requests and responses thereto, and generating or synthesizing a protocol-conformant response to the received request based on similarities and differences between the received request and the previous requests stored in the library. That is, automatic modeling approaches described herein can synthesize protocol conformant responses by mining interaction traces in order to mimic the interaction behavior among enterprise system components. Such embodiments allow for response generation without pre-existing knowledge of (that is, without receiving, processing, or otherwise independently of data explicitly indicating) a structure and/or protocol associated with the incoming message, and are thus referred to herein as "opaque" service virtualization or emulation.

Some embodiments of the present disclosure may enable synthesis of a protocol definition based on recordation and analysis of actual message transactions, deduction of a corresponding (i.e., similar but not necessarily identical) and/or best-matching response message (and suitable payload) upon receiving a message at an emulated endpoint, and generation of a reply to the sending system under test with the appropriate message and payload synthesized based on the analysis and matching. In particular, when an enterprise software system interacts with another system in its deployment environment, observable interaction behaviors, which are referred to herein as interaction traces or message transactions, may be recorded by a network sniffer tool, a proxy or a gateway. As a valid interaction typically conforms to a specific protocol specification, the interaction traces may contain precise information, for example, in terms of sequences of request/response patterns, including but not limited to parameter values and potential temporal properties. Embodiments of the present disclosure thereby infer or deduce enterprise system element interaction behaviors indirectly, through operation on the stored message transactions. While not required, particular embodiments may function by processing interaction traces in order to extract sufficient protocol information therefrom, creating interaction models based on extracted information, and using the created interaction models to communicate with the system under test in the production environment, thereby emulating behavior of the actual systems for quality assurance purposes.

Some embodiments of the present disclosure arise from realization that, as the accuracy of the generated responses in opaque service virtualization may rely on processing and analyzing the recorded interaction traces, efficiency issues may result as the number of interaction traces to be analyzed increases. For example, when a library or database (also referred to herein as a transaction library) contains a large number of interaction traces, searching the entire library to generate run-time responses can become very slow.

As such, some embodiments of the present disclosure use data mining, specifically clustering algorithms, to analyze large amounts or quantities of recorded interaction trace data. In particular, embodiments of the present disclosure use a clustering-based method for the trace analysis function in the pre-processing stage. Given a collection of interaction traces, embodiments of the present disclosure (i) calculate the distance between pairwise interactions and build a distance matrix; (ii) cluster interactions; and (iii) export the clusters and infer the cluster centers for use later in the process. In particular embodiments, the Needleman-Wunsch algorithm may be used as the distance measure, and two clustering algorithms, Bond Energy Algorithm (BEA) and Visual Assessment of cluster Tendency (VAT), may be used to cluster the interactions. Any alternative clustering algorithm may also be used, such as K-Means, density based clustering algorithms, or hierarchical clustering algorithms. With the obtained clusters, efficient yet well-formed runtime response generation may be facilitated in an Enterprise System emulation environment. The effectiveness and efficiency of response synthesis as described herein were evaluated after pre-processing recorded interaction traces of two widely used application-layer protocols: LDAP and SOAP. Experimental results show that, by utilizing clustering techniques in the pre-processing step as described herein, response generation time can be reduced by up to about 99% on average compared with existing approaches.

FIG. 1 is a block diagram illustrating a computing system or environment for opaque service emulation in accordance with some embodiments of the present disclosure. Referring now to FIG. 1, the environment 100 includes a system under test 105, a deployment environment 110 including a plurality of endpoints 111A, 111B, . . . 111N, and a virtual service environment (also referred to herein as an emulation environment) 115. The deployment environment 110 may include one or more software services upon which the system under test 105 depends or otherwise interacts to fulfill its responsibilities. The emulation environment 115 includes a transaction monitor 125, a cluster analyzer 128, a request analyzer 150, a response generator 160, and a message transaction library 130. The message transaction library 130 stores a set of message transactions (including requests and associated responses; generally referred to herein as messages) sampled from prior communications with (i.e., to and/or from) a client (here, the system under test 105) and a target service for emulation or virtualization (here, the deployment environment 110).

The environment 100 of FIG. 1 operates as follows. The system under test 105 is observed communicating with endpoint(s) 111A, 111B, . . . 111N in a deployment environment 110 via a transaction monitor 125, for example, in a pre-processing stage. The transaction monitor 125 may include or implement a network monitoring tool, such as Wireshark®, for monitoring communications between the system under test 105 and the endpoint(s) 111A, 111B, . . . 111N. The system under test 105 and the endpoint(s) 111A, 111B, . . . 111N communicate via a network 120A using a communications mode or protocol, such as Lightweight Directory Access Protocol (LDAP) messages or Simple Object Access Protocol (SOAP) messages, which may be conveyed using Hypertext Transport Protocol (HTTP) with an Extensible Markup Language (XML) serialization.

The transaction monitor 125 records message transactions (including requests and responses thereto) communicated with (i.e., to and/or from) the system under test 105, in particular, between the system under test 105 and the endpoint(s) 111A, 111B, . . . 111N, for example, using a network sniffer tool. The transaction monitor 125 stores these message transactions in the transaction library 130. For example, the transaction monitor 125 may store the transactions between the system under test 105 and the endpoint(s) 111A, 111B, . . . 111N in the transaction library 130 as request/response pairs. For a given protocol, a number of interactions between the system under test 105 and the endpoint(s) 111A, 111B, . . . 111N are recorded, as may be needed for response generation as discussed below. The transaction monitor 125 may also be configured to filter network traffic such that messages of interest may be recorded in a suitable format for further processing. In some embodiments, the transaction monitor 125 may be configured to record the message transactions between the system under test 105 and the endpoint(s) 111A, 111B, . . . 111N in the library 130 without knowledge of structural information (which may indicate the protocol, operation type, and/or header information) of the requests/responses. After the transactions have been recorded, the cluster analyzer 128 may be configured to align the messages in the transaction library 130 in a manner suitable for comparison of characters, byte positions, n-grams, and/or other portions thereof, in order to cluster similar ones of the messages as described herein. The transaction library 130 thus provides historical transaction data for the system under test 105, which is used as a source for protocol analysis and response generation as described in greater detail herein.

In the pre-processing stage, operations may also be performed to distinguish protocol information (i.e. message structural information defined by a particular protocol specification) from payload information (i.e. variables that are produced/consumed by application programs) by further analysis of the messages stored in the transaction library 130, which may increase accuracy and efficiency. For example, in some embodiments, protocol information may be distinguished from payload information based on the relative character lengths of sections of the stored messages (as payload sections may typically include more characters/may be "longer" than protocol sections), and/or based on the relative variability of sections of the stored messages (that is, based on the entropy of the sections relative to one another). In particular, the stored messages may be pre-processed in order to define clusters of similar messages. For a large transaction library, searching every transaction for the closest matching message can be time consuming; thus, clustering the transaction library can reduce the number of messages to be searched (i.e., rather than searching every transaction in the library 130, only the clusters or representative messages of each cluster may be searched). Thus, cluster generation as described herein can make response generation more efficient, which may allow responses to be generated in real-time.

As shown in FIG. 1, embodiments of the present invention provide an analysis function (illustrated as a cluster analyzer 128) that is configured to select and provide representative message transaction data to a distance function and a translation function (illustrated as a request analyzer 150 and a response generator 160), thereby accelerating response generation time at run-time. A framework according to some embodiments is split into 2 consecutive stages, that is, the pre-processing stage and the run-time stage shown in FIG. 1. At the pre-processing stage, the cluster analyzer 128 is used to partition the transaction library 130 into "clusters" of similar messages, using a data clustering method. Any clustering method may be used, such as the Visual Assessment of cluster Tendency (VAT), Bond Energy Algorithm (BEA), K-Means, a hierarchical clustering algorithm, etc. The clustering method may include human supervision (such as in VAT) or may be fully automated in some embodiments. The similarity is determined by a distance function (such as the Needleman-Wunsch sequence alignment algorithm). The distance function may be applied to cluster the messages based on request similarity, response similarity, or a combination of the request and response similarities. The distance function may also weight different parts of the messages differently. For example, different weightings may be assigned to respective sections of the messages based on a relative variability of the position relative to other messages in the transaction library thereof as an indicator of respective information types contained therein, as discussed in detail in commonly-owned U.S. patent application Ser. No. 14/211,933 entitled "ENTROPY WEIGHTED MESSAGE MATCHING FOR OPAQUE SERVICE VIRTUALIZATION," the disclosure of which is incorporated by reference herein.

The cluster analyzer 128 is further configured to determine representative messages (referred to herein as cluster prototypes) for each of the message clusters. The cluster prototypes summarize and/or indicate characteristics of the messages in each cluster. For example, the prototype may be a sample message selected from among the messages of a cluster (such as a centroid message that is determined based on the relative distances of the messages in that cluster), or may be a summary message generated by the cluster analyzer 128 that includes common patterns of messages in the corresponding cluster. The cluster prototypes selected and/or generated for each message cluster may be used at the run-time stage to increase the efficiency of response generation.

The request analyzer 150 and a response generator 160 operate at the run-time stage, using the message clusters generated by the cluster analyzer 128. In particular, as shown in FIG. 1, when running quality assurance (QA) tests against the system under test 105 (i.e., at the run-time stage), the emulation environment 115 may receive a request $Req_{in}$ from the system under test 105 at the request analyzer 150 via a network 120B. The request analyzer 150 is configured to access the transaction history stored in the library 130 to indirectly identify potential valid response messages based on cluster prototypes that match the received request $Req_{in}$, without knowledge or determination of the structure or protocol of the received request $Req_{in}$. For example, the identifying may be performed at run-time without an understanding of the contents of the request, and without pre-processing of the received request $Req_{in}$. In some embodiments, the request analyzer 150 may employ one or more algorithms, such as a distance function, to compare the current request $Req_{in}$ received from the system under test 105 to the respective cluster prototypes for each message cluster to identify one of the message clusters as corresponding to the current request $Req_{in}$. Results ($Req_{sim}$, $Res_{sim}$) of the analysis by the request analyzer 150 (for example, indicating the closest-matching cluster prototype or a closest request/response pair selected from the identified message cluster) are provided to the response generator 160. It will be understood that, as used herein, a "matching" or "corresponding" cluster prototype, message, request, and/or response, as determined for example by the request analyzer 150, may refer to a prototype/message/request/response that is similar (but not necessarily identical) to the request $Req_{in}$ received from the system under test 105.

The response generator 160 is configured to synthesize or otherwise generate a response message $Res_{out}$ based on the results ($Req_{sim}$, $Res_{sim}$) and the incoming request $Req_{in}$ using one or more algorithms, such as a translation function, as described in greater detail below. The response generator 160 thereby returns the generated response $Res_{out}$ to the system under test 105, and the system under test 105 consumes or otherwise processes the generated response $Res_{out}$ and continues running. Thus, the response $Res_{out}$ is automatically generated using the received request $Req_{in}$ from the system under test 105 based on the request/response pairs stored in the transaction library 130, in contrast to some existing emulation approaches, where requests received by the emulation environment may be processed using (typically) manually-specified scripts to generate a response. The automatically generated response $Res_{out}$ is returned to the system under test 105 via the network 120B.

It will be appreciated that in accordance with various embodiments of the present disclosure, the emulation environment 115 may be implemented as a single server, separate servers, or a network of servers (physical and/or virtual), which may be co-located in a server farm or located in different geographic regions. In particular, as shown in the example of FIG. 1, the emulation environment 115 is coupled to the system under test 105 via network 120B. The deployment environment 110 may likewise include a single server, separate servers, or a network of servers (physical and/or virtual), coupled via network 120A to the system under test 105. The networks 120A, 120B may be a global network, such as the Internet or other publicly accessible network. Various elements of the networks 120A, 120B may be interconnected by a wide area network (WAN), a local area network (LAN), an Intranet, and/or other private network, which may not be accessible by the general public. Thus, the communication networks 120A, 120B may represent a combination of public and private networks or a virtual private network (VPN). The networks 120A, 120B may be a wireless network, a wireline network, or may be a combination of both wireless and wireline networks. Although illustrated as separate networks, it will be understood that the networks 120A, 120B may represent a same or common network in some embodiments. As such, one or more of the system under test 105, the deployment environment 110, and the emulation environment 115 may be co-located or remotely located, and communicatively coupled by one or more of the networks 120A and/or 120B. More generally, although FIG. 1 illustrates an example of a computing environment 100, it will be understood that embodiments of the present disclosure are not limited to such a configuration, but are intended to encompass any configuration capable of carrying out the operations described herein.

Figure 2:
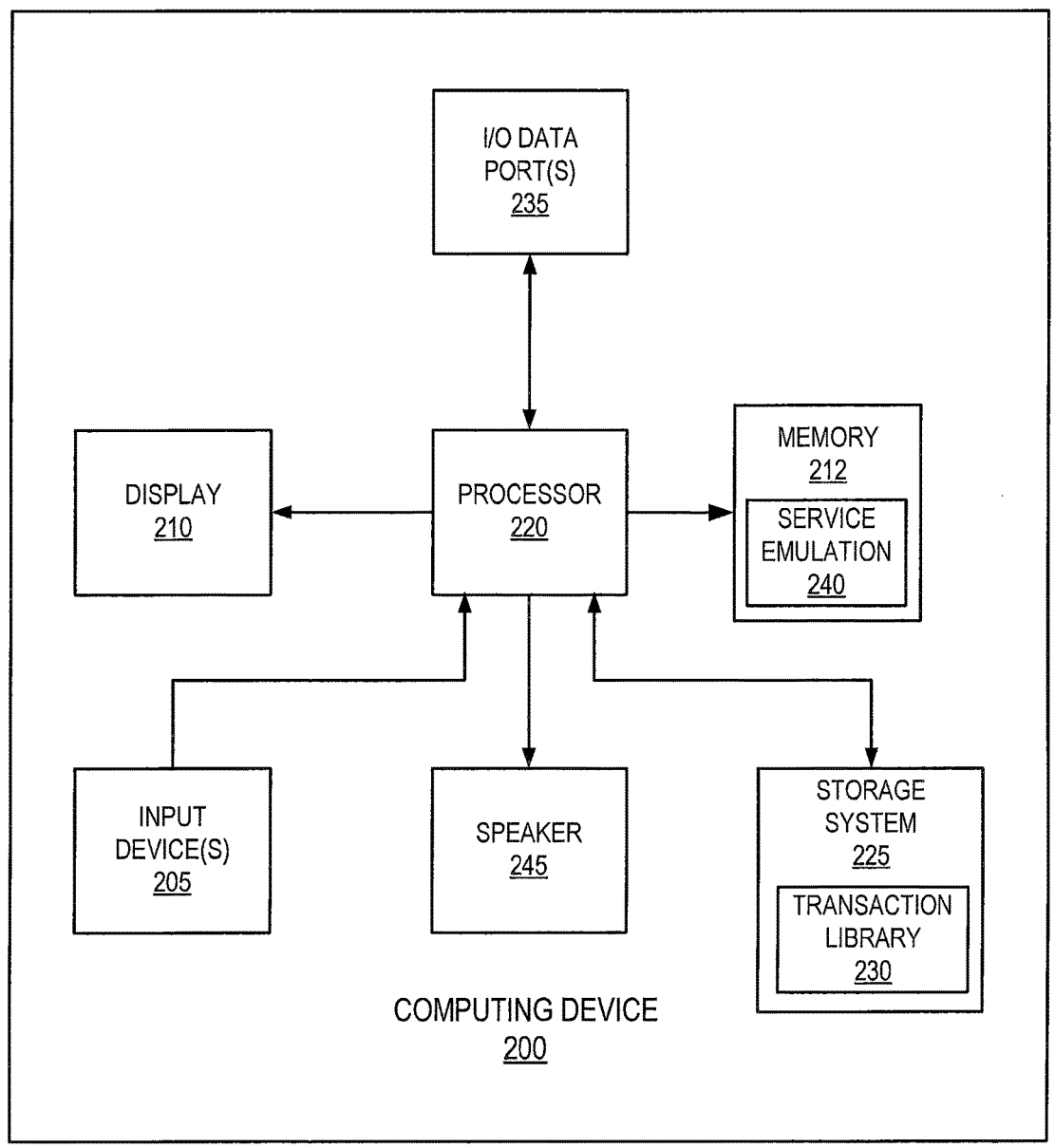
FIG. 2 is a block diagram that illustrates computing device for service emulation in accordance with some embodiments of the present disclosure

FIG. 2 illustrates an example computing device 200 in accordance with some embodiments of the present disclosure. The device 200 may be used, for example, to implement the virtual service environment 115, 915 in the systems 100, 900 of FIGS. 1 and/or 9 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 215 that communicate with one or more processors 220 (generally referred to herein as "a processor"). The computing device 200 may further include a storage system 225, a speaker 245, and I/O data port(s) 235 that also communicate with the processor 220. The memory 212 may include a service emulation module 240 installed thereon. The service emulation module 240 may be configured to mimic the behavior of a target system for emulation in response to a request or other message received from a system under test, as described in greater detail herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may include a transaction library 230 storing data (including but not limited to requests and associated responses) communicated between a system under test and a target system for emulation. Although illustrated in separate blocks, the memory 212 and the storage system 225 may be implemented by a same storage medium in some embodiments. The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a Personal Computer Memory Card International Association (PCMCIA) slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

In communications between two system elements, such as the system under test 105 and the deployment environment 110, both should adhere to a particular protocol specification. It can be inferred that the observable message transactions contain information regarding this protocol specification, also referred to herein as structural information. However, in addition to such structural information, transmitted messages often deliver user data (also known as payloads) that may be consumed/produced by an application using the particular protocol, in order to exchange messages with another application. Message transaction analysis may thus be used by the service emulation module 240 to distinguish protocol-related information (i.e. message format/structure) from application-specific information (i.e. payload) with little or no prior knowledge of the particular protocol used in the message transaction.

In some embodiments, the service emulation module 240 may be configured to pre-process the message transactions stored in the transaction library 230 to investigate widely-used application-layer protocols. Doing so may provide insight into both message structures and encoding rules of available protocols, thereby obtaining a set of heuristic rules for inference purposes. Specifically, if the stored message transactions inherently conform to a protocol whose message structures and encoding rules have been well defined, the messages may be associated with this particular protocol automatically. If, on the other hand, the stored message transactions do not conform to any known protocols, a relevant rule may be automatically selected and a new heuristic rule set may be composed.

One or more distance functions may be used by the service emulation module 240 to indirectly identify similar ones of the stored requests/responses (for cluster generation), to identify common features among the messages in a cluster (for cluster prototype generation), and/or to identify a request from an identified cluster that corresponds to an incoming request (for response generation) based on a measure of similarity, rather than based on knowledge of the underlying structure. One notion of similarity used in some embodiments of the present disclosure is the edit distance between two sequences s1 and s2, which indicates the minimum number of modifications (insertions, deletions, and/or substitutions) in order to obtain s2 from s1. That is, the distance function may be used to compute the number of modifications or alterations among the stored requests/responses (such that ones having similar or lowest relative distances can be grouped in the same cluster), to compute the frequency of occurrence of common characters among the messages of a cluster at respective character positions (such that frequently occurring characters can be included in a cluster prototype), and/or the number of modifications or alterations to the incoming request required to arrive at a request of the identified cluster (such that the request having the lowest distance can be selected for response generation). In some embodiments, different distance functions may be automatically selected for cluster generation, prototype generation, and response generation, for example, based on a particular notion of similarity and/or a particular protocol. Depending on the distance function selected, different ones of the stored requests/responses, prototypes, and/or requests from an identified cluster may be chosen to be the most "similar". In some embodiments, the similarity may be calculated using a distance function that is weighted based on different weightings of respective character positions, as discussed in detail in commonly-owned U.S. patent application Ser. No. 14/211,933 referenced above.

A translation function may be used by the service emulation module 240 to generate or synthesize a valid response to an incoming request. The validity of a generated response may depend on the message structure, as the sequence of transmitted messages typically adhere to a particular protocol specification that is used by an application on one host to exchange data with its communicating partner on other host(s) over the network. The validity of the generated response may also depend on the synthesis of payloads that can be recognized, extracted, and/or further processed by its communicating partner. As both the protocol- and the application-related information may be distinguished by the pre-processing and/or distance calculation, the translation function may be configured to automatically structure messages in the expected format and fill in payload contents.

As mentioned above, in an enterprise system emulation environment (such as the environment 100 of FIG. 1), a request $Req_{in}$ (sent from the enterprise system under test) should be responded to by the emulated operating environment (such as the emulation environment 115) according to the various interaction protocols between the components of the deployment environment (such as the deployment environment 110). Such interaction protocols include LDAP, HTTP/HTTPS, SOAP, SMTP, SMB, etc. In an emulation environment, a request message $Req_{in}$ sent from an enterprise system under test is responded to with a generated response message $Res_{out}$, rather than an actual response message from the deployment environment. This allows a complex, large-scale emulation environment to be provided to the system under test without the scalability and configuration limitations of other techniques. However, the technique can be critically dependent on the ability of the emulation environment to generate realistic responses to the requests.

The observable interaction request messages and response messages communicated between a system under test and a target system contain two types of information: (i) protocol structure information (such as the operation name), used to describe software services behaviors; and (ii) payload information, used to express software systems' attributes. In general, given a collection of message interactions conforming to a specific interaction protocol, the repeated occurrence of protocol structure information may be common, as only a limited number of operations are defined in the protocol specification. In contrast, payload information is typically quite diverse according to various interaction operation parameter values. Message transaction analysis may thus be used to infer protocol-related information from application-specific information by comparing sections of messages, without prior knowledge of the particular protocol used in the message transaction.

In embodiments of the present invention, one or more algorithms are used to classify large numbers of message interactions (e.g., thousands or even millions) into groups or message clusters, to assist and/or reduce the burden in searching for the most similar recorded messages for an incoming request. At a high level, these algorithms can be viewed as an application of clustering and sequence alignment techniques for inferring protocol structure information. In particular, if some requests/responses are less distant (i.e., have similar relative distances) to other requests/responses, then it can be inferred that the less distant requests/responses are more likely to have the same or similar structure information. Hence, computing the distance between each request/response pair may indicate how to classify recorded message interactions into respective message clusters, which may enable more efficient generation of responses that are closer to the expected responses.

FIGS. 4A-4E are diagrams illustrating message analysis for clustering operations in accordance with some embodiments of the present disclosure. Referring now to FIG. 4A, network traffic is transformed to a suitable format for further processing. In particular, in FIG. 4A, raw network data is translated to a corresponding text format. Such data may be stored, for example, as request/response pairs, in a transaction library as described herein. Relative distances between the stored request/response pairs are calculated using a distance function, and a distance matrix containing the calculated distances between the message pairs in the transaction library is generated, as shown in FIG. 4B. FIG. 4C illustrates that the distance matrix provides a basis for further clustering. In particular, in FIG. 4C, a clustering algorithm is applied to the distance matrix. According to clustering results, some or all of the messages stored in the transaction library can be classified into a number of groups or message clusters. As shown in FIG. 4D, each of the message clusters includes request/response pairs having smaller relative distances therebetween. FIG. 4E illustrates that, for each message cluster, a representative message (also referred to herein as a cluster 'center' or prototype) is automatically selected to represent each message cluster.

In the translation operations of FIG. 4A, for a given protocol under investigation, a sufficiently large number of message interactions (e.g., requests and responses) between two (or more) deployed software endpoints or components were recorded, for example, in a transaction library as described herein. The recordings are assumed to be "valid", that is, the sequence of recorded message interactions (i) are correct with regards to the temporal properties of the underlying protocol, and that (ii) each request and response message is well-formed. Without loss of generality, it is assumed that each request is followed by a single response. If a request does not result in a response, a dedicated "no-response" message is inserted into the recorded interaction traces. If, on the other hand, a request results in multiple responses, these responses are concatenated into a single response.

Given these assumptions, ($R_{eq}$, $R_{es}$) denotes a request/response pair of a single message transaction, where $R_{eq}$ represents the request, and the corresponding response to $R_{eq}$ is defined by $R_{es}$. Both $R_{eq}$ and $R_{es}$ are a sequence of characters describing the message structure and payload. An interaction trace is defined as a finite, non-empty sequence of interactions, which is denoted by (($R_{eq1}$, $R_{es1}$), ($R_{eq2}$, $R_{es2}$) ... ($R_{eqn}$, $R_{esn}$)). Tools such as Wireshark® may have the functionality to filter network traffic and record interactions of interest in a suitable textual format for further processing, for example, in the form of $R_{eq}\#R_{es}$, followed by a line break. The recorded transactions may also be processed by the service emulation system (that is by the clustering, matching and translation modules) in their binary format, that is, without any transformation.

In generating the distance matrix of FIG. 4B, given a sufficient number of interactions in suitable formats, a distance or "similarity" between the requests and/or responses of the recorded interaction traces/message transactions may be determined using one or more distance measures or functions. As noted above, one such measure, based on sequence alignment, is known as the Needleman-Wunsch algorithm, and has been used in the area of bioinformatics in order to determine similarities in the amino acid sequences of proteins. In particular, sequence alignment may be used to align all common subsequences of two sequences under comparison, and to insert gaps into either of the sequences when they differ. In order to avoid random alignments of a small size, the algorithm may be modified in such a way that a minimum length may be required in order to identify common subsequences as such.

The following illustrates an example of message alignment in accordance with some embodiments described herein. Consider the following two text sequences:
Where is my computer book?
Where is your computer magazine?
The common subsequences are "Where is", "computer", and "?", while "my" versus "your" and "book" versus "magazine" are the differing parts of the two sequences. The fully aligned sequences will be as follows (where the character "*" denotes an inserted gap):
Where is my* computer book*****?
Where is * your computer ****magazine?
The distance between these two example text sequences may be defined by the number of gaps inserted to both sequences in the alignment process.

Based on the alignment results, the distance measure is defined as:

$$\text{dist}(\text{msg},\text{msg}') = N_{mismatch}/(N_{alg}+N'_{alg}-N_{mismatch}) \quad (1)$$

where $N_{alg}$ and $N'_{alg}$ denote the number/quantity of characters (including inserted gaps) in the sequence alignment for msg, msg', and $N_{mismatch}$ represents the total number of inserted gaps. Therefore, 16/(37+37−16)=0.275 is the distance in the example given above. An N×N symmetrical distance matrix DM may be constructed by iteratively computing the distance for all the candidate requests/responses, where N is the total number of requests/responses.

In clustering the messages in FIG. 4C, once the distance matrix DM has been constructed, the calculated distances are used to group the requests/responses into message clusters. In particular, one or more clustering algorithms are applied to the distance matrix, thereby producing clusters including requests/responses having similar character sequences. Some example embodiments described herein focus on distance matrix reordering as a first step to achieve the clustering, in particular, utilizing the BEA and VAT clustering algorithms. These algorithms do not require definition of the number of clusters or a distance threshold value in advance, as may be needed with some other clustering methods, such as K-Means.

More particularly, the BEA (Bond Energy Algorithm) may be used to cluster large data sets. Given a distance matrix, it can group similar items along the matrix diagonal by permutating rows and columns to maximize the following global measure equation (2), denoted by GM:

$$GM = \Sigma^n_{i=1} \Sigma^n_{j=1} (1-DM_{ij})(2-DM_{i,j-1}-DM_{i,j+1}) \quad (2)$$

where $DM_{ij}$ denotes the distance between $msg_i$ and $msg_j$.

The VAT (Visual Analysis of Cluster Tendency) is a visual method, which works on a pairwise distance matrix D. This algorithm utilizes a modified version of Prim's minimal spanning tree to reorder the rows and columns of the distance matrix. The reordered matrix is displayed as a gray-scale image, as shown in FIG. 4C. Using the BEA algorithm and/or the VAT algorithm to reorder the distance matrix DM may enable users to classify messages based on the matrix image, rather than based on prior knowledge of and/or expertise in the underlying protocol.

FIG. 4E illustrates selection of a representative message for each message cluster, also referred to herein as a cluster prototype. For example, the cluster prototype may be a centroid message or 'center' of the cluster. The representative center is denoted herein by center; for every cluster$_i$, and may be used to reduce or minimize $\Sigma^n_{k=1}$ dist(center$_i$, msg$_k$), where n denotes the number of messages in cluster$_i$, and msg$_k$ represents one of the messages in cluster$_i$. When a request Req$_{in}$ is received, a matching function may be used to identify which of the message clusters most closely corresponds to the incoming request Req$_{in}$, by comparing the request Req$_{in}$ with the representative center or other prototype for each message cluster using at least one distance measure or function as described herein.

After the message cluster most closely corresponding to the incoming request Req$_{in}$ is identified (based on the similarity of its representative cluster center or other prototype), a request among the messages of the identified message cluster may be selected for use in response generation. For example, the representative request may correspond to the center for the identified cluster (referred to herein as the "Center Only" method), or may be a closest-matching one of the requests in the identified cluster (referred to herein as the "Whole Cluster" method). Specifically, given an incoming request Req$_{in}$, the Center Only method directly uses the selected cluster center as its most similar request Req$_{sim}$, while Whole Cluster method uses a further matching function to search for the most similar request Req$_{sim}$ among the messages of the identified message cluster.

A translation function as described herein may be used to generate or synthesize a response for the incoming request, by exploiting commonalities between the incoming request, its closest-matching representative request (denoted herein as Req$_{sim}$), as well as the associated response (denoted herein as Res$_{sim}$). In processing an incoming, unknown request from a system under test, some embodiments of the present disclosure use an approach where, if the incoming request is similar to one of the recorded or generated requests, then the response should also be similar to a previously recorded or generated response associated with the similar one of the recorded or generated requests. Hence, identifying the differences between the incoming and previously recorded requests may provide an indication how the associated recorded response can be altered in order to synthesize a valid response.

In some embodiments, common subsequence identification may be relied upon. In particular, it is noted that many protocols encode information in request messages that are subsequently used in associated responses. For example, application-level protocols such as LDAP add a unique message identifier to each request message, where the associated response message should also contain the same message identifier in order to be seen as a valid response. Therefore, to synthesize responses for LDAP (or similar protocols) in accordance with some embodiment of the present disclosure, the message-id from the incoming request may be copied into the associated one of the recorded response messages. Similarly, information associated with a specific request operation (e.g., a search pattern for a search request) may be "copied" across from the request to its response. For example, some recorded interaction traces between an LDAP client and server may contain a search request for all entries with the name "Baker." If an incoming request defines a search for all entries with the name "Parker," then the two requests can be considered to be similar (as both are search requests; only the name is different). Hence, in generating a search result in response to the request for "Parker", all occurrences of "Baker" in the recorded interaction traces may be replaced with "Parker", and the LDAP message-id may be adjusted accordingly, such that the altered response to the recorded search for "Baker" may be a sufficient response to the search for "Parker" for emulation purposes. Such information is referred to herein as symmetric fields, and the copying of such information from an incoming request in generating a response is referred to herein as symmetric field substitution.

The common subsequence algorithm described above may be used to identify symmetric fields, that is, the common subsequences between a request and its associated response. However, as the symmetric fields may not appear in the same order and/or cardinality, simple sequence alignment may be problematic. Instead, an alignment matrix may be used to identify common subsequences. In order to avoid small and/or random common subsequences, a threshold sequence length (based on a number/amount of characters) may be defined as to when a common sequence of characters is considered a symmetric field. Once the symmetric fields between Req$_{sim}$ and Res$_{sim}$ are determined, the corresponding field information may be identified in the incoming request Req$_{in}$ and substituted in Res$_{sim}$ in order to synthesize the final response Res$_{out}$.

The following example illustrates the identification of symmetric fields and how symmetric fields are used in the response generation process in accordance with some embodiments of the present disclosure. Consider the following incoming LDAP search request:

Message ID: 18
ProtocolOp: searchRequest
ObjectName: cn=Mal BAIL,ou=Administration,
 ou=Corporate,o=DEMOCORP,c=AU
Scope: 0 (baseObject)

In generating a response to the above request, a search for the most similar/closest matching request among the recorded interaction traces stored in the transaction library is performed using the distance function, and may return the following recorded request:

Message ID: 37
ProtocolOp: searchRequest
ObjectName: cn=Miao DU,ou=Administration,
 ou=Corporate,o=DEMOCORP,c=AU
Scope: 0 (baseObject), which is paired with the following recorded response:
  Message ID: 37
  ProtocolOp: searchResEntry
  ObjectName: cn=Miao DU,ou=Administration,
    ou=Corporate,o=DEMOCORP,c=AU
  Scope: 0 (baseObject)
  Message ID: 37
  ProtocolOp: searchResDone
  resultCode: success
Symmetric field identification as described herein results in two substrings that are identical across request and response:
  Message ID: 37
  ProtocolOp:
and
  ObjectName: cn=Miao DU,ou=Administration,
    ou=Corporate,o=DEMOCORP,c=AU
  Scope: 0 (baseObject)
By substituting the corresponding values from the incoming request, the following response is generating in accordance with some embodiments of the present disclosure:
  Message ID: 18
  ProtocolOp: searchResEntry
  ObjectName: cn=Mal BAIL,ou=Administration,
    ou=Corporate,o=DEMOCORP,c=AU
  Scope: 0 (baseObject)
  Message ID: 18
  ProtocolOp: searchResDone
  resultCode: success Accordingly, some embodiments of the present disclosure provide service emulation or virtualization methods that do not require explicit or pre-existing knowledge of the underlying structural information (which may indicate the protocol, operation type, and/or header information) of messages. Rather, such methods may generate responses indirectly or "opaquely" by using a received request and a distance function to find the closest matching request in a transaction library, and may then return the associated response from the transaction library, as modified with symmetric field substitution from the received request.

Opaque message matching in accordance with embodiments of the present disclosure thus allows a service or system to be virtualized without (or otherwise independent of) data explicitly indicating the service protocol message structure and/or service operation types. In particular embodiments, the Needleman-Wunsch sequence matching algorithm may be used to match message requests as a series of bytes for service virtualization, thereby requiring no knowledge of the message protocol or other structural information. Entropy-based weighting of message sections during distance calculation may also be used to increase accuracy in response generation. Furthermore, embodiments of the present disclosure may increase the efficiency of opaque message matching, by using clustering to organize the transaction library into groups of similar messages, thus reducing the number of transactions to be searched during the response generation process. As such, responses can be generated in real-time, even for large transaction libraries.

Figure 3:
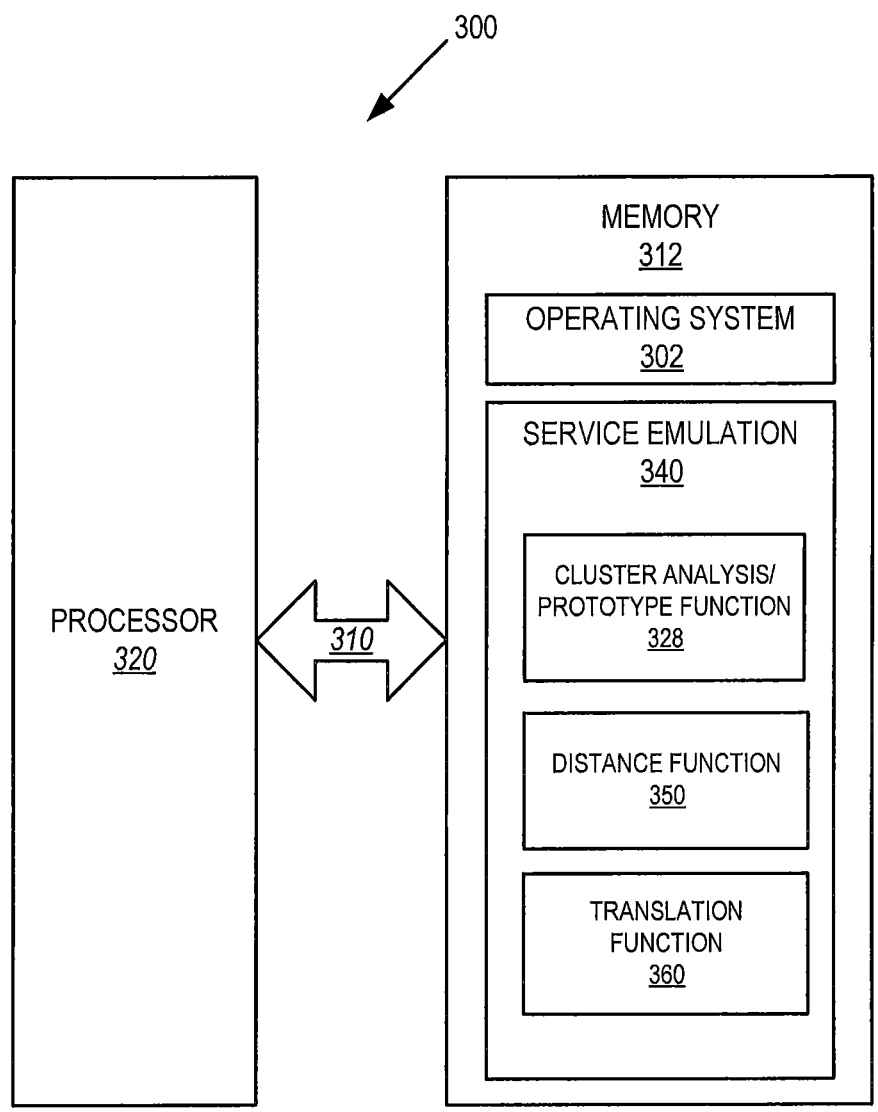
FIG. 3 is a block diagram that illustrates a software/hardware architecture for service emulation in accordance with some embodiments of the present disclosure.

FIG. 3 illustrates a computing system or environment for opaque service emulation in accordance with further embodiments of the present disclosure. In particular, FIG. 3 illustrates a processor 320 and memory 312 that may be used in computing devices or other data processing systems, such as the computing device 200 of FIG. 2 and/or the virtual service environments 115, 915 of FIGS. 1 and/or 9. The processor 320 communicates with the memory 312 via an address/data bus 310. The processor 320 may be, for example, a commercially available or custom microprocessor, including, but not limited to, digital signal processor (DSP), field programmable gate array (FPGA), application specific integrated circuit (ASIC), and multi-core processors. The memory 312 may be a local storage medium representative of the one or more memory devices containing software and data in accordance with some embodiments of the present invention. The memory 312 may include, but is not limited to, the following types of devices: cache, ROM, PROM, EPROM, EEPROM, flash, SRAM, and DRAM.

As shown in FIG. 3, the memory 312 may contain multiple categories of software and/or data installed therein, including (but not limited to) an operating system block 302 and a service emulation block 340. The operating system 302 generally controls the operation of the computing device or data processing system. In particular, the operating system 302 may manage software and/or hardware resources and may coordinate execution of programs by the processor 320, for example, in providing the service emulation environments 115, 915 of FIGS. 1 and/or 9.

The service emulation block 340 is configured to carry out some or all of the functionality of the cluster analyzers 128, 928, the prototype generator 929, the request analyzers 150, 950, and/or the response generators 160, 960 of FIGS. 1 and/or 9. In particular, the service emulation block 340 includes a cluster analysis/prototype function module 328, a distance function module 350, and a translation function module 360. Responsive to accessing a transaction library including a set of messages (including requests and associated responses) communicated between a client (such as the system under test 105 of FIGS. 1 and/or 9) and a target service for virtualization (such as one or more of the endpoints 111A . . . 111N of the deployment environment 110 of FIGS. 1 and/or 9), the cluster analysis/prototype function module 328 groups similar ones of the messages to partition the transaction library into "clusters" of similar messages. The similarity is determined using one or more distance measures or functions (such as the Needleman-Wunsch sequence alignment algorithm). The distance function may also be weighted according to different weightings assigned to respective sections of the messages stored in the transaction library, for example, based on the relative variability of characters in the message sections as an indicator of the information types contained therein.

The cluster analysis/prototype function module 328 further determines respective cluster prototypes for each of the message clusters. The cluster prototype functions as a representative for the group of similar message transactions of the corresponding message cluster. The cluster analysis/prototype function module 328 may select a sample transaction from the messages of the cluster (such as a centroid transaction) as the cluster prototype, or may generate the cluster prototype to include (or "summarize") common patterns of the message transactions in the cluster. For example, in some embodiments the cluster analysis/prototype function module 328 may calculate relative distances between the messages of a particular cluster (for example, using sequence matching as described herein), and may select a representative one of the messages as the cluster prototype for that cluster based on the relative distances. For instance, the cluster analysis/prototype function module 328 may calculate the centroid transaction by identifying the message transaction having the lowest sum of the absolute distances to other message transactions in the cluster, the lowest sum of squared distances. Other methods for selecting a representative transaction for the cluster may also be used. Table 4a below illustrates an example centroid transaction prototype.

Alternatively, the cluster analysis/prototype function module 328 may identify one or more common features or commonalities among the message transactions of a cluster, and generate the cluster prototype to include the common features of the transactions in the cluster. For example, a cluster prototype may be generated to include a substring sequence that is common to two or more message transactions of the cluster. A substring sequence may be defined as a sequence of n or more bytes or characters, and substring sequences which occur in more than a predetermined percentage X of the message transactions in the cluster may be included in the common substring set, where the percentage X may be a configurable threshold. The relative positions in the requests and/or responses in which the common substring sequences occur may also be recorded. Table 4b below illustrates an example of calculating common substring sequences.

Also, a cluster prototype may be generated to include particular characters at particular sections thereof based on a frequency of such characters in respective positions of the message transactions of the cluster. For example, a frequency table may be generated to identify the characters or bytes which occur at each position in the message. To calculate the frequency table, messages in the cluster may be aligned, for example, using a fixed alignment, or a multiple sequence alignment algorithm (such as ClustalW). Table 4c below illustrates an example of calculating a frequency table.

In addition, a cluster prototype may be generated to represent a "consensus" transaction for the cluster. In particular, after completing a multiple sequence alignment, the consensus may be calculated by selecting, at each byte (or character) position, the most commonly occurring byte or character at that position, provided the byte/character has a relative frequency above a predetermined threshold. In other words, the cluster prototype may include a particular byte/character at a particular position when there is a consensus (among the message transactions of the cluster) as to the commonality of the byte at that position). Positions for which there is no consensus may be left as a gap in the consensus transaction. Table 4d below illustrates an example of calculating a transaction consensus. Consensus prototype generation is discussed in greater detail below with reference to FIGS. 9-12.

It will be understood that these and/or other operations of the cluster analysis/prototype function 328 may be performed as a pre-processing step, prior to any response generation. Also, the pre-processing message cluster generation operations performed by the cluster analysis/prototype function module 328 may utilize the same distance function utilized by the distance function module 350 in run-time response generation operations (as discussed below), or a different distance function may be used.

Still referring to FIG. 3, at run-time, the distance function module 350 compares an unknown, incoming message with the cluster prototype for each of the message clusters generated by the cluster analysis/prototype function 328, in order to determine the similarity of the message clusters relative to the incoming message. The message cluster corresponding to the cluster prototype having the minimum distance to the incoming request may be selected as the matching cluster. Thus, rather than comparing the incoming message to all of the messages in the transaction library, the distance function compares the incoming request only with the cluster prototypes, reducing the processing burden and allowing for increased speed and efficiency. As such, for an unknown request from a system under test, the most similar one of the message clusters can be identified and selected using the distance function.

As noted above, the distance function utilized by the distance function module 350 may be the same as or different than the distance function used by the cluster analysis/prototype function 328 during cluster generation. However the response generation distance function (used by the distance function module 350) may only compare the incoming request to the cluster prototype (as no response is available for comparison), while the cluster generation distance function (used by the by the cluster analysis/prototype function 328) may compare information from the stored requests and/or the responses. Also, the distance function utilized by the distance function module 350 may be weighted according to different weightings assigned to respective sections of the cluster prototypes, for example, based on the relative variability of respective character positions therein as an indicator of the information types contained in the sections.

After selecting the closest-matching message cluster to the incoming request, the distance function module 350 selects a particular message transaction from the identified message cluster. In some embodiments, the distance function module 350 may compare the unknown request with all of the individual message transactions (that is, each of the stored requests) in the identified message cluster (as sequences of bytes or characters). The distance function 350 may thereby select a closest-matching one of the stored requests in the identified message cluster based on subsequence or pattern matching, rather than (i.e., independent of) message structure information (which may indicate the protocol, operation type, and/or header information) of the incoming request. For example, the distance function module 350 may be configured to implement the Needleman-Wunsch global sequence alignment algorithm in measuring the similarity of the received request to each of the messages of the identified message cluster. However, other distance functions may also be used. Also, in some embodiments, the distance function 350 may simply select one of the requests in the identified message cluster (for example, a request corresponding to a centroid transaction), rather than comparing the incoming request to each individual request of the identified message cluster. Other criteria may also be used to select a particular message transaction from the identified message cluster.

The translation function module 360 performs response generation using the message transaction selected by the distance function module 350, for example, using symmetric field substitution. In particular, the translation function module 360 identifies symmetric fields (that is, matching character strings) between the request and response of the selected message transaction. Symmetric fields may refer to common subsequences, of a length greater than a given threshold, which occur in both the request and associated response of a selected message transaction. In some embodiments, shorter subsequences (which occur wholly within a longer common subsequence) may be ignored. For example, for the two character strings "Hello_World" and "Hello_Kitty", "Hello_" is a common subsequence. The shorter subsequence matches occurring within "Hello_" (such as "Hell", "llo_", "ello", etc.) may be ignored when substituting fields from a matching request/response pair to generate the response to the incoming request from the system under test. The translation function module 360 may thereby generate the response independent of receiving data or other knowledge indicating structural information (including the protocol, operation type, and/or header information) of the incoming request, by substituting the symmetric fields from a response associated with the selected one of the requests from the identified message cluster.

Although FIG. 3 illustrates example hardware/software architectures that may be used in a device, such as the computing device 200 of FIG. 2, to provide opaque service emulation in accordance with some embodiments described herein, it will be understood that the present invention is not limited to such a configuration but is intended to encompass any configuration capable of carrying out operations described herein. Moreover, the functionality of the computing device 200 of FIG. 2 and the hardware/software architecture of FIG. 3 may be implemented as a single processor system, a multi-processor system, a processing system with one or more cores, a distributed processing system, or even a network of stand-alone computer systems, in accordance with various embodiments.

Computer program code for carrying out the operations described above and/or illustrated in FIGS. 1-3 may be written in a high-level programming language, such as COBOL, Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 5:
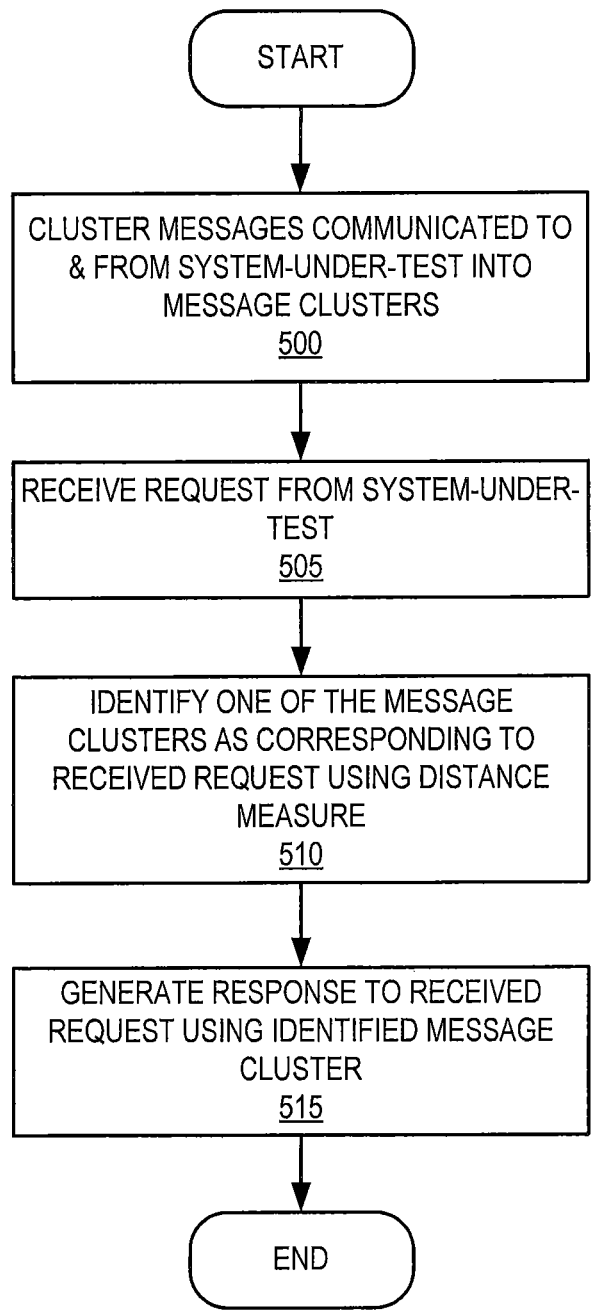
FIGS. 5-6 are flowcharts illustrating methods for service emulation in accordance with some embodiments of the present disclosure.
Figure 6:
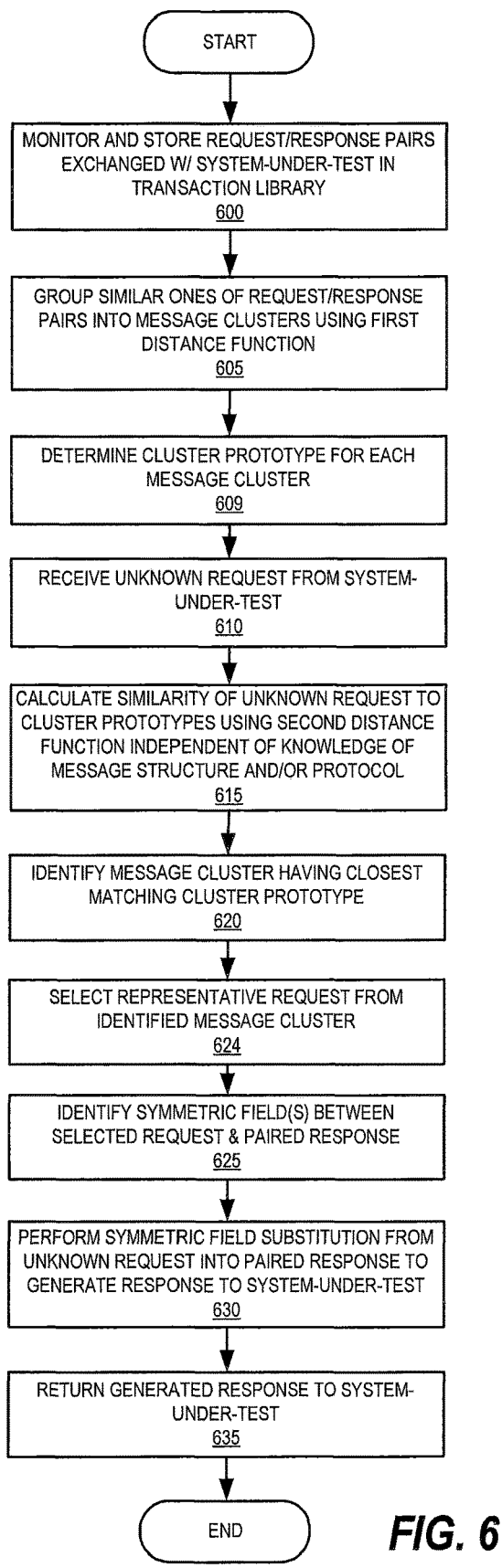

Operations for providing opaque service emulation in accordance with some embodiments of the present disclosure will now be described with reference to the flowcharts of FIGS. 5 and 6. FIGS. 5 and 6 illustrate operations that may be performed by a virtual service environment (such as the environment 115 of FIG. 1) to emulate the behavior of a target system for virtualization (such as the environment 110 of FIG. 1) in response to a request from the system under test (such as the system under test 105 of FIG. 1).

Referring now to FIG. 5, operations begin at block 500 where messages (including requests and associated responses) that have been previously communicated with (i.e., to and/or from) the system under test are clustered or otherwise grouped into message clusters. For example, the messages may be stored in a transaction library, and the transaction library may be partitioned based on relative similarities among the messages to define message clusters including similar ones of the stored messages. The relative similarities of the stored messages may be calculated using a distance function or measure, such as the Needleman-Wunsch sequence alignment algorithm. For example, the distance function may be applied based on request similarity, response similarity, or a combination of request and response similarities. In some embodiments, the distance function may weight different parts of the messages differently. For example, different weightings may be assigned to respective sections of the messages based on a relative variability thereof as an indicator of respective information types contained therein.

Still referring to FIG. 5, at block 505, a request is received from the system under test. The request may be transmitted from the system under test to request a service on which the system under test depends, such as that provided by one or more of the endpoints 111A-111N of the deployment environment 110 of FIG. 1. For example, the received request may be in the form of an LDAP or a SOAP message. At block 510, one of the message clusters is identified as corresponding to the received request using a distance function or measure. For example, a representative message (referred to herein as a cluster prototype) may be selected or generated for each of the message clusters in a pre-processing step, a similarity of the received request to each of the cluster prototypes may be determined using the distance function, and one of the message clusters corresponding to the closest-matching one of the cluster prototypes may be identified. The cluster identification at block 510 may be performed independently of a similarity of the received request to all of the individual messages of each message cluster; that is, the incoming request may be compared only to the cluster prototypes, rather than to each message in a cluster, to identify one of the message clusters.

The distance function used in cluster identification at block 510 may be the same as or different than the distance function used in cluster generation at block 500, and may be independent of a message structure (which may indicate protocol, operation type, and/or header information) of the received request, such that a closest matching one of the cluster prototypes may be indirectly identified based on similarity, rather than based on the contents thereof. In some embodiments, this distance function used cluster identification at block 510 may also be entropy-weighted as discussed above, such that different weightings may be assigned to respective sections of the cluster prototypes based on a relative variability of character positions therein as an indicator of respective information types contained therein.

Using the identified one of the stored message clusters, a response to the received request is generated at block 515. For example, a particular message from the identified message cluster may be selected (for example, a center message or a closest-matching message from the identified message cluster), and the response may be generated therefrom using common subsequence identification and/or symmetric field substitution as described herein.

FIG. 6 illustrates operations for providing opaque service emulation in accordance with some embodiments of the present disclosure in greater detail. Referring now to FIG. 6, operations begin at block 600 by monitoring communication messages (including request/response pairs; also referred to as "message transactions") exchanged between a system under test and one or more endpoints, and storing the request/response pairs in a transaction library. The endpoint(s) may correspond to a system upon which the system under test depends (that is, where the system under test is a client), such as the endpoints 111A-111N of the deployment environment 110 of FIG. 1. The request/response pairs stored in the transaction library are used as historical data for generating a response to an incoming request from a system under test, by matching the incoming request to one of the stored requests, and generating the response based on a stored response associated with the matching one of stored requests. Embodiments of the present invention further improve such message matching by using clustering to group or organize the transaction library, thereby reducing the search and matching burden and increasing efficiency.

In particular, the request/response pairs stored in the transaction library are pre-processed at block 605 to group similar ones of the request/response pairs into respective message clusters using a first distance function (also referred to herein as a clustering distance measure). For example, relative distances between respective requests and responses may be calculated based on the clustering distance measure, and the transaction library may be partitioned based on the relative distances such that the message clusters include requests and responses having similar relative distances. A data clustering method or algorithm (such as VAT), BEA, K-Means, a hierarchical clustering algorithm, etc.) may be used to group messages/transactions into clusters of similar messages. For instance, a distance matrix may be generated to include the relative distances for the respective requests and responses, and the clustering algorithm may be applied to the distance matrix to group the requests and responses having similar relative distances into the message clusters. The clustering algorithm may be fully automated, or may include some human supervision (such as in VAT).

At block 609, a cluster prototype is generated or otherwise determined for each message cluster. The cluster prototype for a message cluster may be a sample request/response selected from that message cluster (such as the centroid transaction), or may be a "summary" that is generated by identifying one or more commonalties among the requests/responses of the cluster and including the one or more commonalities in the cluster prototype. The commonalities may be identified based on common substring(s), frequencies of characters, and/or commonalities of characters at particular message positions. Each message cluster thereby includes a corresponding cluster prototype that represents the messages thereof.

At block 610, an unknown request $Req_{in}$ is received from a system under test. The unknown request $Req_{in}$ may be directed to an endpoint and/or environment for which service emulation is desired, such as the deployment environment 110 of FIG. 1. Responsive to receiving the unknown request $Req_{in}$, a similarity of the unknown request $Req_{in}$ to the cluster prototype for each of the message clusters is calculated at block 615 using a second distance function. For example, the second distance function may be used to compare the sequence of bytes or characters of the unknown request $Req_{in}$ to each of the cluster prototypes, and to determine a similarity thereto based on a byte-by-byte or character-by-character comparison. The second distance function may be the same as or different than the first distance function. For example, the Needleman-Wunsch function may be used as the second distance function; however, embodiments of the present disclosure are not limited thereto.

At block 620, a message cluster that most closely corresponds to or matches the unknown request $Req_{in}$ is indirectly identified based on the calculated distance of the corresponding cluster prototype (rather than based on knowledge of the contents thereof). The identification is performed based on the similarity calculated at block 615, and independent of knowledge of a message structure and/or protocol of the unknown request $Req_{in}$. In some embodiments, a maximum distance threshold may be used such that, if no message clusters are identified as having a distance to the unknown request $Req_{in}$ less than the maximum distance threshold, then a default response (such as an error message) may be generated and transmitted to the system under test.

Responsive to identifying one of the message clusters at block 620, a request $Req_{sim}$ is selected for the identified message cluster at block 624. For example, the request $Req_{sim}$ may be a request corresponding to a centroid one of the messages in the identified cluster, or may be a closest-matching one of the requests in the identified cluster. One or more symmetric fields between the request $Req_{sim}$ and its associated paired response $Res_{sim}$ are identified at block 625. For example, the symmetric field(s) may be identified by recording position indices of each symmetric field within $Req_{sim}$ and $Res_{sim}$. In some embodiments, the same matching string may occur multiple times within $Req_{sim}$ and/or $Res_{sim}$, and the position of each instance may be recorded.

At block 630, symmetric field substitution is performed to modify the paired response $Res_{sim}$ with the symmetric information from the unknown request $Req_{in}$, to generate a response $Res_{out}$ to the system under test. For example, as noted above, a sequence alignment algorithm such as Needleman-Wunsch may be used to align $Req_{sim}$ and $Req_{in}$ based on byte index or character position. For each symmetric field identified at block 625, the position indices may be updated to compensate for any gaps which may have been inserted during alignment of $Req_{sim}$ and $Req_{in}$, resulting in modified positions. If gaps are inserted within the symmetric field, then the length of the symmetric field may also be modified, resulting in a modified length, and the match string may likewise be modified to contain the aligned bytes or characters in the symmetric field position for $Req_{in}$, resulting in a modified string. For each of the symmetric fields, the matching subsequence may be copied from the unknown request $Req_{in}$ to create the new response $Res_{out}$ by overwriting the characters or bytes at the corresponding positions in the response $Res_{sim}$. If the modified length is different to the original symmetric field length, then extra bytes (or characters) may be inserted or deleted into the response $Res_{out}$ at the symmetric field positions, to compensate. As such, a response $Res_{out}$ to the unknown request $Req_{in}$ may be generated based on the response $Res_{sim}$ associated with the request $Req_{sim}$ selected from the message cluster that was identified as corresponding to the unknown request $Req_{in}$. The generated response $Res_{out}$ is then transmitted to the system under test at block 635.

Embodiments of the present disclosure will now be described with reference to the following example, illustrating the generation of a response to an unknown request. Table 1 below illustrates an example message transaction library, such as the libraries 130, 230 discussed above:

TABLE 1

Example Message Transaction Library

| # Request | Response |
| --- | --- |
| 1 {Id:1,Msg:SearchRq,Lastname:Du} | {Id:1,Msg:SearchRsp,Result: Ok,Firstname:Miao, Lastname: Du,Telephone:12345678} |
| 2 {Id:2,Msg:SearchRq,Lastname: Versteeg} | {Id:2,Msg:SearchRsp,Result: Ok,Firstname:Steve,Lastname: Versteeg,Telephone:11111111} |
| 3 {Id:3,Msg:AddRq,Lastname:Schneider, Firstname:Jean-Guy,Telephone:123456} | {Id:3,Msg:AddRsp,Result:Ok} |
| 4 {Id:4,Msg:SearchRq,Lastname:Han} | {Id:4,Msg:SearchRsp,Result: Ok,Firstname:Jun,Lastname:Han, Telephone:33333333} |

TABLE 1-continued

Example Message Transaction Library

| # | Request | Response |
|---|---------|----------|
| 5 | {Id:5,Msg:SearchRq,Lastname:Grundy} | {Id:5,Msg:SearchRsp,Result:Ok, Firstname:John,Lastname:Han, Telephone:44444444} |
| 6 | {Id:6,Msg:AddRq,Lastname:Hine, Firstname:Cam,Telephone:555555} | {Id:6,Msg:AddRsp,Result:Ok} |

In the present example, after applying a clustering algorithm, the messages are grouped into two clusters as shown in Tables 2 and 3:

TABLE 2

Example Cluster 1

| # | Request | Response |
|---|---------|----------|
| 1 | {Id:1,Msg:SearchRq,Lastname:Du} | {Id:1,Msg:SearchRsp,Result: Ok,Firstname:Miao,Lastname: Du,Telephone:12345678} |
| 2 | {Id:2,Msg:SearchRq,Lastname:Versteeg} | {Id:2,Msg:SearchRsp,Result: Ok,Firstname:Steve,Lastname: Versteeg, Telephone:11111111} |
| 4 | {Id:4,Msg:SearchRq,Lastname:Han} | {Id:4,Msg:SearchRsp,Result: Ok,Firstname:Jun,Lastname: Han,Telephone:33333333} |
| 5 | {Id:5,Msg:SearchRq,Lastname:Grundy} | {Id:5,Msg:SearchRsp,Result: Ok,Firstname:John,Lastname: Han,Telephone:44444444} |

TABLE 3

Example Cluster 2

| # | Request | Response |
|---|---------|----------|
| 3 | {Id:3,Msg:AddRq,Lastname:Schneider, Firstname: Jean-Guy,Telephone:123456} | {Id:3,Msg:AddRsp,Result:Ok} |
| 6 | {Id:6,Msg:AddRq,Lastname:Hine, Firstname:Cam,Telephone:555555} | {Id:6,Msg:AddRsp,Result:Ok} |

A cluster prototype can be generated or otherwise selected for each cluster using several methods. For example, the centroid transaction prototype for cluster 1 may be:

TABLE 4a

Example Centroid Transaction Prototype

| 1 | {Id:1,Msg:SearchRq,Lastname:Du} | {Id:1,Msg:SearchRsp,Result: Ok,Firstname:Miao, Lastname:Du,Telephone:12345678} |
|---|---------|----------|

The list of common substrings for the prototype of cluster 1 may be:

TABLE 4b

Example Common substring prototype

{Id: ,Msg:SearchRq,Lastname:

Also, a frequency table for cluster 1 may be calculated using multiple sequence alignment, which may yield the following (using ClustalW):

{Id:1,Msg:SearchRq,Lastname: ------Du}

{Id:4,Msg:SearchRq,Lastname: -----Han}

{Id:2,Msg:SearchRq,Lastname:Versteeg}

{Id:5,Msg:SearchRq,Lastname:G-rundy-}

Counting the frequencies of different byte values at each byte position yields the following frequency table:

TABLE 4c

Example Frequency table prototype

```
{  4
}                                                          4
:        4    4              4
,           4         4
1     1
2     1
4     1
5     1
D                                              1
G                                         1
H                                              1
I  4
L                        4
M        4
R              4
S           4
V                                    1        1
a              4         4  4              1
c                 4
d  4                                          1
e           4                 4  1         1 1
g        4                                    1
h              4
m                       4
n                          4           1     1
q                 4
r                    4                 2
s        4                 4        1
t                          4        1
u                                   1     1
y                                         1
─                                 2 3 2 2 2 1  1
```

Using the same multiple sequence alignment as with the frequency table prototype, the consensus prototype may be (using a threshold of 0.5):

TABLE 4d

Example Consensus sequence prototype

{Id:-,Msg:SearchRq,Lastname:--r-----}

Thus, embodiments of the present disclosure provide a system that is configured to automatically build executable interactive models of software service behavior from recorded message transactions, without prior knowledge of the internals of the service and/or of the protocols the service uses to communicate, which can reduce human effort in manually specifying models, as well as reduce reliance on system experts and/or the need for extensive documentation of the service protocol and behavior. Models may be built directly from interaction traces previously recorded between a system under test and a software service upon which the system under test depends, by using the interaction traces as a library with which to compare new, unknown requests received from a system under test. A distance function, such as the Needleman-Wunsch longest common subsequence alignment method, may be used to calculate the distances/similarities between an unknown request from a system under test and the recorded message transactions. In some embodiments, the response associated with the closest matching request is identified as the most relevant response to use in synthesis of a response to a system under test, where symmetric field substitution is used to modify the identified response so that it is tailored to the unknown request.

Further embodiments are directed to an extension of opaque response matching for service emulation/virtualization, based on realization that some fields in the incoming request (such as the operation name) are more relevant in identifying a stored request/response for generation of a response to the system under test. Still further embodiments may use clustering to group responses and requests, and then infer relevant or critical junctures at which different types of responses are sent for similar looking requests. Utilizing conversation state information may also improve the accuracy of synthesized responses.

As such, embodiments of the present disclosure may allow for (semi-) automatic identification of which part(s) of a request message most likely correspond to a service operation name, use of this information to divide the set of interaction traces into clusters containing a single operation type only, and restriction of the search for the most similar request to one cluster only. Such an approach should also improve run-time performance.

Specific examples discussed below provide results of the use of two clustering algorithms (BEA and VAT) and the Needleman-Wunsch longest common subsequence distance measure combined with symmetric field substitution in opaque response generation for two message protocols. In particular, for evaluation purposes, two protocols were used where the precise message structures (as well as the corresponding temporal properties) are known: the Simple Object Access Protocol (SOAP) and the Lightweight Directory Access Protocol (LDAP). SOAP is a light-weight protocol designed for exchanging structured information typically in a decentralized, distributed environments, whereas LDAP may be widely used in large enterprises for maintaining and managing directory information. The interaction trace for SOAP used for evaluation was generated based on a recording of a banking example using the LISA® tool. The protocol included 7 different request types, each with a varying number of parameters, encoding typical transactions from a banking service. From a predefined set of account identifiers, account names, etc., an interaction trace containing 1,000 request/response pairs was generated. Amongst those, there were 548 unique requests (with 25 requests occurring multiple times), 714 unique responses (the replicated ones predominantly due to the fact that the deleteToken-Response message only had true or false as possible return values), and 22 duplicated request/response pairs. For purposes of evaluation, this was considered a sufficiently diverse population of messages to work with.

The following is one of the recorded requests:

```
<?xml version="1.0"?>
    <S:Envelope
    xmlns:S="http://schemas.xmlsoap.org/soap/envelope/">
      <S:Body>
        <ns2:getAccount xmlns:ns2="http://bank/">
          <accountId>867-957-31</accountId></ns2:getAccount>
      </S:Body>
    </S:Envelope>
with the following the corresponding response:
<?xml version="1.0"?>
    <S:Envelope
    xmlns:S="http://schemas.xmlsoap.org/soap/envelope/">
      <S:Body>
        <ns2:getAccountResponse xmlns:ns2="http://bank/">
          <return>
          <accountId>867-957-31</accountId>
          <fname>Steve</fname>
          <lname>Hine</lname>
          </return>
          <ns2:getAccountResponse>
        <S:Body>
      <S:Envelope>
```

This example illustrates that, besides the structural SOAP information encoded in both messages, there may be specific information that appears in both the SOAP request and SOAP response, such as the account-ID in the example above. LDAP is a binary protocol that uses an ASN.1 encoding to encode and decode text-based message information to and from its binary representation, respectively. A corresponding decoder was used in order to translate recorded LDAP messages into a text format and an encoder was used to check whether the synthesized responses were well-formed.

The LDAP interaction trace used for the evaluation included 1000 unique interactions containing some core LDAP operations, such as adding, searching, modifying etc. applied a sample directory. The trace did not contain duplicated requests or responses, and the search responses contained a varying number of matching entries, ranging from zero to 12.

The following briefly illustrates the textual representation of a search request:
  Message ID: 15
  ProtocolOp: searchRequest
  ObjectName: cn=Juliet LEVY,ou=Administration,
      ou=Corporate,o=DEMOCORP,c=AU
  Scope: 0 (baseObject)
, and the associated response, including the merge of a search result entry and a search result done message:
  Message ID: 15
  ProtocolOp: searchResEntry
  ObjectName: cn=Juliet LEVY,ou=Administration,
      ou=Corporate,o=DEMOCORP,c=AU
  Scope: 0 (baseObject)
  Message ID: 15
  ProtocolOp: searchResDone
  resultCode: success This example LDAP request contains a (unique) message identifier (Message ID: 15) and a specific object name (ObjectName: . . . ) as the root node for the search to be used. The associated responses use the same message identifier (to indicate the request they are in response to) and the searchResEntry message refers to the same object name as the request. To synthesize correct LDAP responses, the corresponding information can be copied across from the incoming request to the most similar response to be modified.

Figure 7:
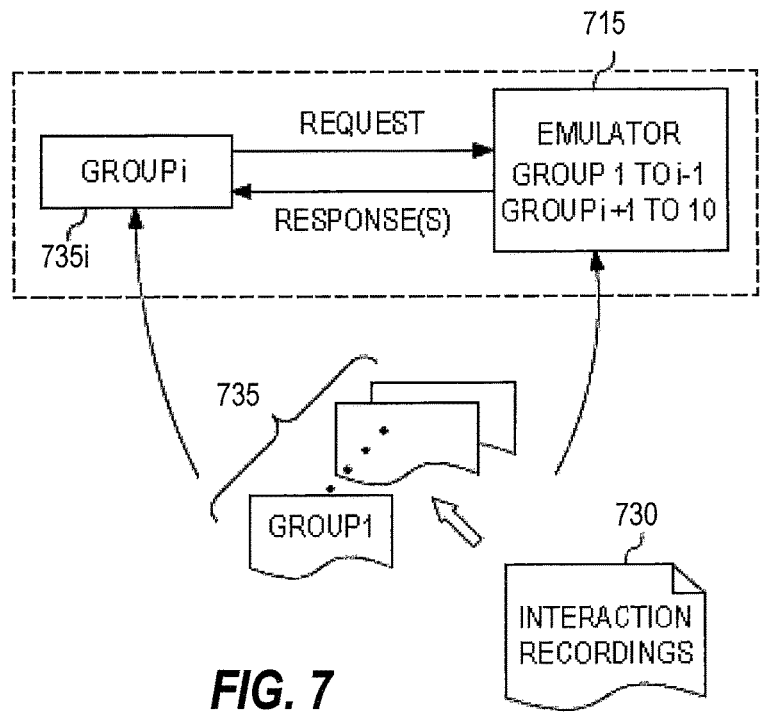
FIG. 7 is a block diagram illustrating a cross-validation approach for service emulation in accordance with some embodiments of the present disclosure.

A cross-validation approach is one method for assessing how the results of a statistical analysis may be generalized to an independent data set. For evaluation purposes, a 10-fold cross-validation approach was used for the recorded SOAP messages and the recorded LDAP messages. As shown in FIG. 7, a recorded data set 730 was randomly partitioned into 10 groups 735. Of the 10 groups, Group i 735i is considered to be the evaluation group, and the remaining 9 groups define the training set. The cross-validation process was repeated 10 times (the same as the number of groups), so that each of the 10 groups 730 was used as the evaluation group 735i once. For each message in the evaluation group 735i, the resulting response generated by the emulator 715 was compared with the associated recorded response. Both the effectiveness and the efficiency of the response synthesis were investigated. The following criteria were used to evaluate the effectiveness of synthesized responses:

1. Identical: the synthesized response is identical to the recorded response if all characters in the synthesized response exactly match those in the recorded response.
2. Protocol Conformant: the synthesized responses are well-formed and also conform to the temporal interaction properties of the given protocol, i.e., the temporal consistency between request and response is preserved.
3. Well-Formed: the synthesized responses correspond to the structure required for responses as defined by the underlying protocol.
4. Ill-Formed: synthesized responses that do not meet the above criteria.

For the efficiency investigation, for each message in the evaluation Group I 735i, the amount of time taken to synthesize a response for an incoming request was recorded. Also, a weaker notion of "protocol conformant" was used, as the order in which the requests are selected from the evaluation set is random and, as a consequence, unlikely to conform to the temporal sequence of request-response pairs.

For purposes of evaluation, a "whole-interaction-trace-based" approach (as described in commonly-owned U.S. patent application Ser. No. 14/223,607 entitled "MESSAGE MATCHING FOR OPAQUE SERVICE VIRTUALIZATION," the disclosure of which is incorporated by reference herein), referred to as the "No-Cluster" method, was used to benchmark both the effectiveness and efficiency of the cluster-based approach for synthesizing responses according to embodiments of the present disclosure. In particular, in the pre-processing stage, the BEA clustering algorithm and VAT clustering algorithm were applied to cluster interactions; and then, at the runtime stage, the Centre Only method and Whole Cluster method described above were used to synthesize responses.

In comparing the different outcomes achieved with the No Cluster method and cluster-based approaches for SOAP, neither the Centre Only method nor the Whole Cluster method appeared to generate ill-formed SOAP responses, and thus, produced the same outcomes as using the No Cluster method. This shows that for the SOAP case study used, the cluster-based approach had the same effectiveness as the No Cluster method in synthesizing accurate responses.

In addition, regardless of the method used to generate a response (i.e., either the No Cluster method or cluster-based methods), more time was consumed to synthesize responses for longer incoming requests. However, an improvement of the generation time was observed by using cluster-based approaches. Specifically, response generation time of using Whole Cluster methods was found to be at least 5 times quicker than using the No Cluster method; using Centre Only was able to further accelerate response message synthesis by approximately 120 times than when using the No Cluster method. Furthermore, although there was found to be more fluctuation in the response generation time when using the BEA algorithm to cluster messages, the selection of clustering approaches did not appear to significantly impact the response generation time. Based on these observations for the SOAP protocol, the Centre Only method was able to provide a good response message synthesis.

In comparing the different outcomes achieved with the No Cluster method and cluster-based approaches for LDAP, for the No Cluster method, 451 (out of 1,000) generated response messages were identical to the corresponding recorded responses (45.1%), and an additional 457 of the generated responses met the protocol conformant criterion (45.7%). Therefore, a total of 908 (or 90.8%) of all generated responses were considered to be valid. In contrast, the cluster-based approaches generated less valid responses, the number of which decrease by 14.7% to around 761 (out of 1000). By observing valid responses of cluster-based approaches, it was determined that the VAT algorithm offered better performance than the BEA algorithm. However, there was no distinguishable difference between results of the Centre Only method and the Whole Cluster method.

For both protocols, response generation time increased with the length of incoming requests. As the length of the majority of the LDAP incoming requests was shorter than the SOAP incoming requests, the LDAP response generation time was shorter than SOAP response generation time. Specifically, compared with the average response generation time of using No Cluster method (about 53.28 ms), using the Whole Cluster method produced responses about 9 times faster (about 5.46 ms), while using the Centre Only method further improved the generation time to around 0.79 ms. The response generation time when using the Whole cluster method fluctuated significantly, because the sizes of the respective clusters generated by the clustering algorithms were different. Therefore, the amount of time required to generate responses (when using the Whole Cluster method) varies with the size of the particular cluster. In contrast, as the number of clusters is stable, the response generation time when using the Centre Only method was observed to have only a slight fluctuation.

Based on the SOAP and LDAP experimental results, the cluster-based approach was able to generate valid responses more efficiently than searching the entire transaction library, illustrating that that the time cost of generating responses can be significantly reduced by reducing the number of distance calculations. However, as illustrated in the results for LDAP, the cluster-based approaches generated fewer valid responses. This can be attributed to differences between the SOAP and LDAP protocols. Most application-level protocols define message structures containing some form of operation or service name in their request, followed by a payload containing the data upon which the service is expected to operate. In LDAP, some messages may contain significantly more payload information than operation information; thus, two LDAP messages of different operation types, but with a similar payload, may be found to be the closest matching messages. In such a case, a response of the wrong operation type may be sent back, resulting in an invalid response.

According to embodiments of the present disclosure, data mining techniques may be used for opaque response generation in a large enterprise software emulation environment, and may be improved by clustering previously recorded interaction traces in a pre-processing stage. The clustered results may facilitate the mimicking of software interaction behaviors in the run-time stage, in particular, by reducing the number of distance calculations to be performed. As embodiments of the present disclosure do not require explicit knowledge of the protocols used by the target software components to communicate, the human effort of manually specifying interaction models may be eliminated. Moreover, by utilizing data mining techniques, the efficiency of response generation in the emulation environment may be greatly improved. Experimental results conducted on LDAP and SOAP protocols demonstrated that the response generation time can be reduced by 99% on average compared to non-clustering approaches, while the accuracy of response generation (the valid response rate) was 100% for SOAP and 75% for LDAP.

Embodiments of the present disclosure thus provide an automated approach to service emulation which uses no explicit knowledge of the services, their message protocols and structures, and yet can simulate, to a high degree of accuracy and scale, a realistic enterprise system deployment environment. To achieve this, embodiments of the present disclosure provide automated, accurate, efficient and robust systems and methods for service emulation that derive service responses from collected actual network traces between an enterprise system and a service, in particular, using message trace recordings collected a priori to produce a response on behalf of a service when invoked by a system-under-test at runtime.

Further embodiments, as described in greater detail below, may provide improved cluster center selection methods to automatically summarize common characters among one or more messages within a cluster, which can be further used for synthesizing representative cluster centers. Clustering algorithms (such as k-means or other centroid based clustering, density based clustering, hierarchical clustering, visual clustering such as VAT, or other clustering method) may be used to group requests/responses. Multiple sequence alignment algorithms may be used to help to infer the most common characters among the grouped requests/responses. The Needleman-Wunsch algorithm, which has relatively high time complexity, may be used for the edit distance calculation for evaluation purposes; however, the efficiency of distance calculations may be improved by using parallel processing and using an approximation of the Needleman-Wunsch edit distance. Embodiments of the present disclosure may also be tested on larger trace collections and/or on a wider range of protocols, for example, proprietary protocols on legacy mainframe systems, which are often poorly documented.

In particular, further embodiments of the present disclosure may arise from realization that searching the collected message traces to automatically generate service responses may be limited to text based protocols, may be inefficient for large message traces, and/or may be sensitive to mismatching by payload versus operation type (i.e., may not be robust). In addition, while clustering the collected message traces into groups or clusters of similar messages and selecting a single representative message for each cluster may accelerate runtime performance and improve efficiency, it may come at the expense of decreased accuracy. In particular, runtime performance may be improved by enabling incoming requests from the system under test to be compared only to the cluster representations (rather than the entire transaction library); however, by selecting the cluster centroid request (e.g., the transaction with the minimized total distance from the other transactions in the cluster) as the representative message, accuracy may decrease as the information from the other requests in the cluster may be discarded.

Accordingly, further embodiments of the present disclosure may achieve both higher accuracy and efficiency through the use of descriptive and robust message prototypes which can be applied to both binary and text protocols. In particular, further embodiments as described in detail below may improve accuracy, while preserving efficiency, by generating cluster prototypes which capture the common features of the range of requests in each cluster. For example, some embodiments utilize multiple sequence alignment algorithms to create message cluster prototypes, insert wildcard characters into the message cluster prototypes for sections with high variability, utilize a modified distance algorithm (e.g., a modified Needleman-Wunsch algorithm) for message distance calculations with an incoming request, and use entropy-based weightings in distance calculations for increased accuracy. The combination of some of these techniques can significantly improve the accuracy of the record-and-replay approaches, without requiring prior knowledge of the services (models). In particular, some embodiments have shown greater than 99% accuracy for the 4 enterprise system messaging protocols evaluated.

Figure 9:
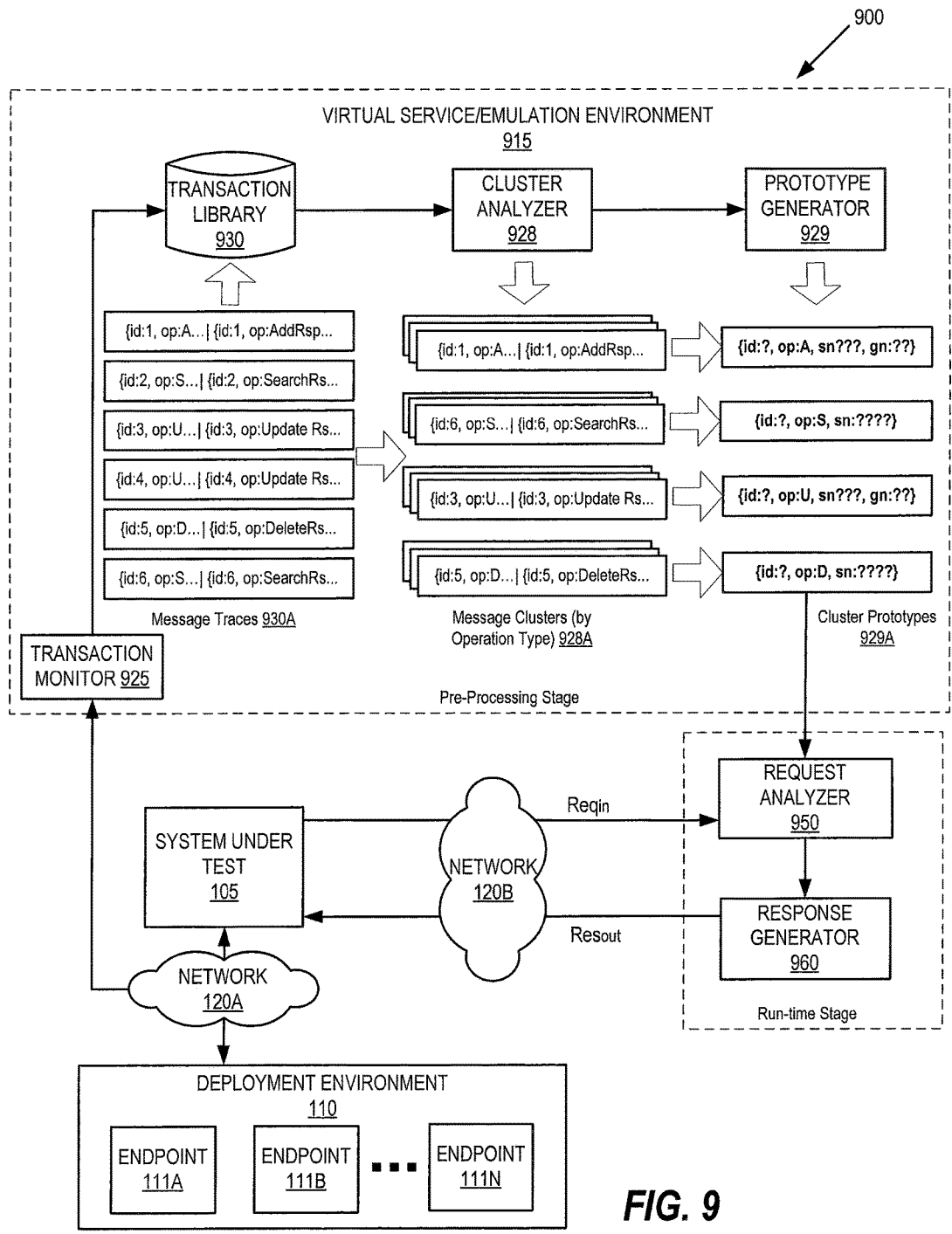
FIG. 9 is a block diagram of a computing system or environment for service emulation in accordance with some further embodiments of the present disclosure.
Figure 10:
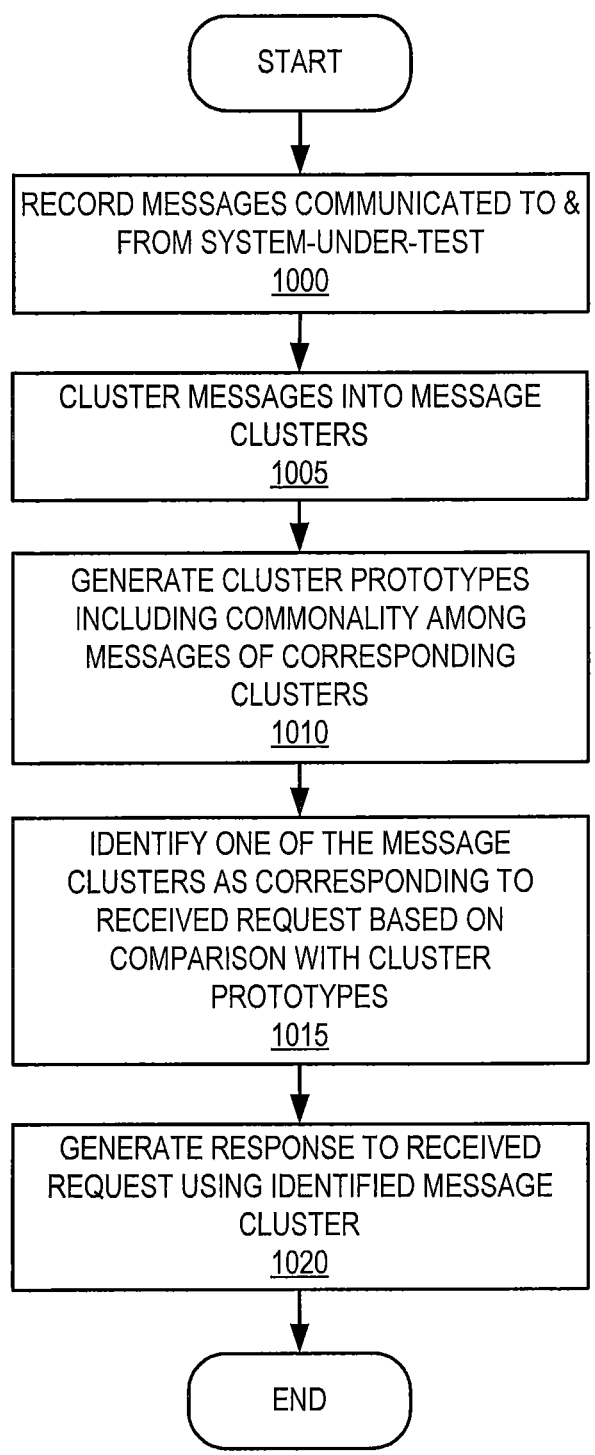
FIGS. 10-12 are flowcharts illustrating methods for service emulation in accordance with some further embodiments of the present disclosure.

An approach for generating and using cluster prototypes is described below with reference to the block diagram of FIG. 9 and the flowchart of FIG. 10, which illustrate operation of a computing system or environment 900 for opaque service emulation in accordance with further embodiments of the present disclosure. Referring now to FIGS. 9 and 10, the environment 900 includes a system under test 105, a deployment environment 110 including a plurality of endpoints 111A, 111B, . . . 111N, and a virtual service environment (also referred to herein as an emulation environment) 915. The deployment environment 110 may include one or more software services upon which the system under test 105 depends or otherwise interacts to fulfill its responsibilities, the functionality of which is similar to that described in detail above with reference to FIG. 1. The emulation environment 915 includes a transaction monitor 925, a cluster analyzer 928, a cluster prototype generator 929, a request analyzer 150, a response generator 960, and a message transaction library 930. The message transaction library 930 stores a set of message transactions (including requests and associated responses; generally referred to herein as messages) sampled and recorded from prior communications with (i.e., to and/or from) a client (here, the system under test 105) and a target service for emulation or virtualization (here, the deployment environment 110) by the transaction monitor 925.

As shown in FIG. 9, embodiments of the present invention provide an analysis function (as performed by cluster analyzer 928) that is configured to select and provide representative message transaction data (as generated by prototype generator 929) to a matching function (as performed by request analyzer 950) and a translation function (as performed by response generator 960), thereby accelerating response generation (as well as the accuracy thereof) at run-time. A framework according to some embodiments is split into 2 consecutive stages, that is, the offline or pre-processing stage and the run-time stage shown in FIG. 9.

In the pre-processing stage, as shown at block 1000 of FIG. 10, the transaction monitor 925 is configured to record message transactions (including requests and responses thereto) communicated with (i.e., to and/or from) the system under test 105 or other client. In particular, as shown in FIG. 9, message traces 930A (in the form of request-response pairs) communicated between the system under test 105 and the endpoint(s) 111A, 111B, . . . 111N, are recorded by a transaction monitor 925, for example, using a network sniffer tool. The transaction monitor 925 stores these message transactions in the transaction library 930, without knowledge of structural information (which may indicate the protocol, operation type, and/or header information) of the requests/responses.

Also in the pre-processing stage, the cluster analyzer 928 is configured to partition the messages 930A of the transaction library 930 into message "clusters" 928A using a data clustering method. As shown at block 1005 of FIG. 10, the messages 930A are clustered into different groups 928A of messages based on a similarity thereof. The similarity may be determined by a distance function (such as the Needleman-Wunsch sequence alignment algorithm). The distance function may be applied to cluster the messages based on request similarity, response similarity, or a combination of the request and response similarities. In some embodiments, the message clusters 928A may be generated such that messages having a similar operation type are grouped in a same cluster. For example, the distance function may assign different weights to different parts of the messages based on a relative variability of a particular position or section relative to other messages in the transaction library thereof as an indicator of respective operation types contained therein, as discussed in detail in commonly-owned U.S. patent application Ser. No. 14/211,933 entitled "ENTROPY WEIGHTED MESSAGE MATCHING FOR OPAQUE SERVICE VIRTUALIZATION," the disclosure of which is incorporated by reference herein.

Still referring to the pre-processing stage, the cluster prototype generator 929 is configured to generate representative messages 929A (referred to herein as cluster prototypes) for each of the message clusters. As shown in block 1010 of FIG. 10, cluster prototypes 929A of the request messages (also referred to herein as consensus request message prototypes) are generated to include one or more commonalities among the request messages in each cluster, which as noted above, may be grouped by operation type. In particular embodiments, the prototype generator 929 is configured to align the request messages of each cluster to identify common features or characters for each operation type. For example, gap characters may be inserted among the messages of each cluster to align common characters based on a frequency of occurrence at respective character positions of the messages. To create a consensus request message prototype 929A, the prototype generator 929 may extract a character sequence including the common characters (also referred to therein as a consensus character sequence) from the aligned request messages of each cluster, for instance, by selecting or deleting a character at respective character positions. In some embodiments, the prototype generator 929 may also calculate positional weightings to prioritize different sections of each consensus request message cluster prototype 929A, for example, based on a relative variability of the character positions therein, using entropy weighting in a manner similar to that discussed above with reference to U.S. patent application Ser. No. 14/211,933. The prototypes 929A generated for each message cluster 928A may be used at the run-time stage to increase the efficiency of response generation.

At runtime, the emulation environment 915 may receive a request message $Req_{in}$ from the system under test 105 at the request analyzer 950 via a network 120B. The request analyzer 950 is configured to indirectly identify at least one of the clusters 928A that includes potential valid responses to the request message $Req_{in}$ based on consensus request message prototypes 929A generated by the prototype generator 929 and without knowledge or determination of the structure or protocol of the received request message $Req_{in}$. In particular, as shown at block 1015 of FIG. 10, for the incoming request message $Req_{in}$, a matching distance calculation technique is used to compare the current request $Req_{in}$ received from the system under test 105 to the respective consensus request message prototypes 929A for each message cluster 928A to identify one of the message clusters 928A as corresponding to the current request $Req_{in}$. Results of the analysis by the request analyzer 950 (for example, indicating the closest-matching prototype 929A and/or the corresponding message cluster 928A) are provided to the response generator 960. As used herein, a "matching" or "corresponding" prototype, cluster, message, request, and/or response, as determined for example by the request analyzer 950, may refer to a prototype/message/request/response that is similar (but not necessarily identical) to the request $Req_{in}$ received from the system under test 105.

At runtime, the response generator 960 is configured to synthesize or otherwise generate a response message $Res_{out}$ based on the results from the request analyzer 950 and the incoming request $Req_{in}$. In particular, as shown at block 1020 of FIG. 10, a response to the request is generated using the particular message cluster 928A corresponding to the prototype 929A that was identified. For example, the response generator 960 may select one of the stored request messages (for example, a centroid message) from the identified message cluster 928A, and perform dynamic substitutions on a corresponding stored response message from the identified operation type cluster 928A to generate a response message $Res_{out}$ to be transmitted back to the enterprise system under test 105. Thus, the response $Res_{out}$ is automatically generated using the received request $Req_{in}$ from the system under test 105 based on one of the request/response pairs of a selected message cluster 928A, and is returned to the system under test 105 via the network 120B.

In some embodiments of the present disclosure, the Needleman-Wunsch algorithm is selected as the particular distance function used at different steps during the offline and runtime processing. As discussed above, Needleman-Wunsch is a dynamic programming algorithm which finds a globally optimal alignment for two sequences of symbols in O(M N) time, where M and N are the lengths of the sequences. Needleman-Wunsch uses a progressive scoring function S, which gives an incremental score for each pair of symbols in the alignment. Using Needleman-Wunsch, a different score results depending on whether the symbols under comparison are identical, different, or a gap has been inserted. Embodiments of the present disclosure may use a distance function (such as Needlman-Wunsch or a modification thereof) in at least three operations described herein; for example, as discussed in detail below, respective distance functions may be used in cluster generation and prototype generation in the pre-processing stage, as well as in response generation at the runtime stage.

Operations for providing opaque service emulation in accordance with some further embodiments of the present disclosure will be described below with reference to the flowcharts of FIGS. 11 and 12, which illustrate the operations of blocks 609 and 615 of FIG. 6 in greater detail, respectively. Referring again to FIG. 6, actual message transactions between a client (such as a previous version of the system under test 105) and the service to be emulated are recorded at block 600. A transaction is a request-response pair of communicated messages, where the service may respond with zero or more response messages to a request message from the client. Requests and corresponding responses are recorded at the network level (for example, using a network sniffer tool such as Wireshark), and the bytes are recorded in TCP packet payloads. The transactions are recorded with no assumptions about (and thus independent of) the message format of the service application. An example library of recorded transactions is provided in Table 5.

TABLE 5

Directory Service Interaction Library Example

| Index | Request | Response |
|---|---|---|
| 1 | {id:1,op:S,sn:Du} | {id:1,op:SearchRsp,result:Ok,gn:Miao,sn:Du,mobile:5362634} |
| 13 | {id:13,op:S,sn:Versteeg} | {id:13,op:SearchRsp,result:Ok,gn,Steve,sn:Versteeg,mobile:9374723} |
| 24 | {id:24,op:A,sn:Schneider,mobile:123456} | {id:24,op:AddRsp,result:Ok} |
| 275 | {id:275,op:S,sn:Han} | {id:275,op:SearchRsp,result:Ok,gn:Jun,sn:Han,mobile:33333333} |
| 490 | {id:490,op:S,sn:Grundy} | {id:490,op:SearchRsp,result:Ok,gn:John,sn:Grundy,mobile:44444444} |
| 2273 | {id:2273,op:S,sn:Schneider} | {id:2273,op:SearchRsp,result:Ok,sn:Schneider,mobile:123456} |
| 2487 | {id:2487,op:A,sn:Will} | {id:2487,op:AddRsp,result:Ok} |
| 3106 | {id:3106,op:A,sn:Hine,gn:Cam,Postpcode:33589} | {id:3106,op:AddRsp,result:Ok} |

Having recorded observed messages in a transaction library, similar ones of the transactions are grouped (for example, by operation type), again, without knowledge or independent of the message formats. In particular, at block 605, the messages are grouped into respective message clusters using a distance function-based clustering technique. For example, the Needleman-Wunsch algorithm may be used to calculate the edit distance between messages and group transactions by the similarity of the response messages. In comparing the similarity of the request messages and that of the response messages, response similarity can be more effective for grouping transactions of the same operation type. Some embodiments described herein utilize the VAT clustering algorithm; however, it will be understood that alternative clustering algorithms may be used.

Applying clustering to the example transaction library of Table 5 yields two clusters, as shown in the examples of Tables 6 and 7, corresponding to the search operations and add operations, respectively.

TABLE 6

Cluster 1 (search operations)

| Index | Request | Response |
|---|---|---|
| 1 | {id:1,op:S,sn:Du} | {id:1,op:SearchRsp,result:Ok,gn:Miao,sn:Du, mobile:5362634} |
| 13 | {id:13,op:S,sn:Versteeg} | {id:13,op:SearchRsp,result:Ok,gn:Steve,sn: Versteeg,mobile:9374723} |
| 275 | {id:275,op:S,sn:Han} | {id:275,op:SearchRsp,result:Ok,gn:Jun,sn:Han, mobile:33333333} |
| 490 | {id:490,op:S,sn:Grundy} | {id:490,op:SearchRsp,result:Ok,gn:John,sn: Grundy,mobile:44444444} |
| 2273 | {id:2273,op:S,sn:Schneider} | {id:2273,op:SearchRsp,result:Ok,sn:Schneider, mobile:123456} |

TABLE 7

Cluster 2 (add operations)

| Index | Request | Response |
|---|---|---|
| 24 | {id:24,op:A,sn:Schneider,mobile: 123456} | {id:24,op:AddRsp,result:Ok} |
| 2487 | {id:2487,op:A,sn:Will} | {id:2487,op:AddRsp,result:Ok} |
| 3106 | {id:1106,op:A,sn,:Hine,gn:Cam, postalCode:33589} | {Id:1106,Msg:AddRsp,result:Ok} |

A representative cluster prototype for each message cluster is generated at block 609. Referring now to FIG. 11, to formulate a representative cluster prototype, the request messages in a cluster are aligned to identify common characters at block 1105. In aligning the request messages of a cluster, a multiple sequence alignment (MSA) technique may be used. Using MSA for revealing commonalities of interaction messages can offer a number of advantages over other techniques, such as n-grams. In particular, MSA can effectively handle single-byte operation fields often used in messaging protocols (e.g., in the binary LDAP protocol), as well as multi-byte operation fields. In addition, MSA may not require a predetermined matching sequence width (e.g., n in n-gram).

In particular embodiments, ClustalW is used for MSA. ClustalW is relatively memory efficient, and can produce high accuracy alignments in polynomial computation time for empirical datasets (in contrast to the NP– complete MSA technique). ClustalW is a progressive MSA algorithm, where pairwise sequence alignment results are iteratively integrated into the multiple sequence alignment result. An overview of the ClustalW algorithm is as follows:

1. N(N−1)/2 pairs of sequences are aligned to calculate their similarity ratio by using the Needleman-Wunsch algorithm, where N is the number of sequences.

2. A N×N distance matrix is built for capturing distance calculation.

3. A guide tree (i.e., a tree data structure that organizes the similarities between sequences) is constructed from the distance matrix by applying a neighbor-joining clustering algorithm.

4. The guide tree is used to guide a progressive alignment of sequences from the leaves to the root of the tree.

Results of multiple sequence alignment by applying the ClustalW algorithm to the example clusters from Tables 6 and 7 are shown below. The MSA results can be referred to as MSA profiles. Gaps inserted during the alignment process are denoted with the '*' symbol. Note that the common sequences for the requests in each cluster have now been aligned.

{$id$: **1*, $op$: S, $sn$: *******Du}

{$id$: **13, $op$: S, $sn$: *Versteeg}

{$id$: 2273, $op$: S, $sn$: Schneider}

{$id$: 275*, $op$: S, $sn$: *Han*****}

{$id$: 490*, $op$: S, $sn$: Grundy***}

Cluster 1 (Search Operations) Alignment

{$id$: 24, $op$: A, $sn$: Schne*ider, $mo*bil$***e: 123456}

{$id$: 2487, $op$: A, $sn$: W***************** i]*]*******}

{$id$: 3106, $op$: A, $sn$: Hi*ne, $gn$: Cameron, $postalCode$: 3*3589}

Cluster 2 (Add Operations) Alignment

Figure 11:
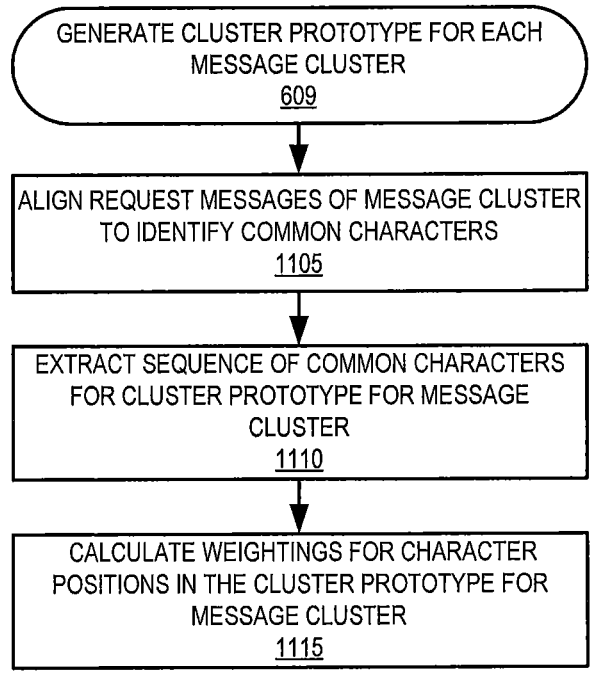

Still referring to FIG. 11, having derived the MSA profile for the request messages of each cluster, the common characters are extracted at block 1110, while accommodating variations, to define a single character sequence. The cluster prototype is generated to include this sequence of common characters, to facilitate runtime comparison in the incoming request message $Req_{in}$ from the system under test 105. In particular, a byte (or character) occurrence count table is derived from the aligned request messages in a cluster, as shown in Table 8. Table 8 graphically depicts byte frequencies at each position for the example alignment of Cluster 2 above. Each column represents a position in the alignment result. The frequencies of the different bytes which occur at each position are displayed as a stacked bar graph.

+0 TABLE 8

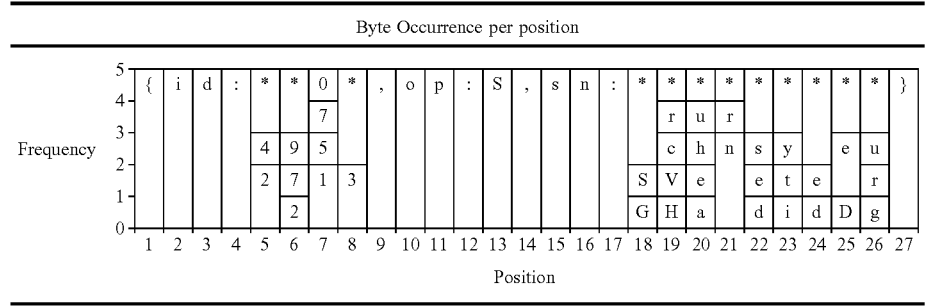

Based on the byte occurrence shown in Table 8, a cluster prototype (in particular, a consensus request message prototype) is generated by extending the concept of a consensus sequence used in summarizing a MSA profile. A consensus sequence refers to a sequence of consensus symbols, where the consensus symbol $c_i$ is the most commonly occurring byte at the position i. A consensus request message prototype, p, is calculated by iterating each byte position of the MSA profile, to calculate a prototype symbol, pi, at each position, according to equation 1 below, $$pi = c_i \quad \text{if } q(c_i) \geq f \wedge c_i = * \qquad (1)$$
$$\quad \bot \quad \text{if } q(c_i) \geq 1 \wedge c_i = *$$
$$\quad ? \quad \text{otherwise}$$

where $q(c_i)$ denotes the relative frequency at position i of the consensus symbol $c_i$, f is the relative frequency threshold, '*' denotes a gap, '?' is the 'wildcard' symbol, and '$\bot$' represents a truncation. After calculating the prototype symbol for each position, the truncation symbols are deleted from the consensus request message prototype.

Introducing wildcards and truncations into the message prototypes allows for distinguishing between positions having gaps, and positions where there is a lack of consensus. In particular, for a respective character or byte position, if the relative frequency $q(c_i)$ is at or above the threshold f, then the consensus symbol is inserted into the prototype (unless the consensus symbol is a gap); if the relative frequency is below the threshold f, then a wildcard is inserted into the prototype. If the consensus symbol is a gap and is in the majority, then that position is left empty (i.e., deleted). Wildcards (?) are used to encode high variability sections of the message. Without truncations, consensus sequences can become long, as there may be many gaps inserted in the alignment operations. By truncating these gaps, the lengths of the prototypes are made to be similar to the typical lengths of messages in the cluster. The consensus prototype for a cluster of request messages can thus differentiate stable positions from variant positions. Moreover, the prototype can identify consensus symbols that can be utilized for matching. Applying the above consensus request message prototype method, using a frequency threshold of f=0.8, to the example clusters in Tables 6 and 7 yields the following results:

Consensus prototype for the search request cluster (Cluster 1):
{id:???,op:S,sn:???????}

Consensus prototype for the add request cluster (Cluster 2):
{id:????,op:A,sn:????????????1???????}
Note that the 'Add' prototype contains an '1' from coincidentally aligning '1's from the strings 'mobile', 'Will', and 'postalCode'.

Referring again to FIG. 11, at block 1115, weightings are calculated for each byte or character position in the consensus request message prototype, to support the distance matching process for incoming request messages at runtime. In some embodiments, generating a response message of the correct or matching operation type (with respect to the incoming request) is more critical than the contents of the message payload. Thus, a higher weighting is assigned to the sections of the message that likely relate to the operation type. As structure information (such as operation type) is typically more stable than payload information, the relative variability of the respective message sections or positions can be used as an indicator of information type (e.g., structure vs. payload). Entropy can be used as a measurement of variability, to calculate a weighting for each byte position of the consensus prototype.

For example, using the MSA profiles defined above, the entropy for each column is calculated using the Shannon Index, as given by equation 2, $$E_i = -\sum_{j=1}^{R} q_{i,j} \log q_{ij} \qquad (2)$$

where Ei is the Shannon Index for the ith column, qij is the relative frequency of the jth character in the character set at column i, and R is the total number of characters in the character set.

To assign a high weighting to more stable parts of the message, for each column the entropy is inverted by applying a scaling function of the form given in equation 3, $$w_i = \frac{1}{(1 + bE_i)^c} \qquad (3)$$

where $w_i$ is the weighting for the ith column, Ei is the entropy of the ith column, and b and c are positive constants. The higher the values of b and c, the higher entropy columns are de-weighted. In some embodiments, best results may be obtained with b=1 and c=10. This allows structural information to strongly dominate in the matching process. Payload similarity can be used as a 'tie-breaker'.

Columns that correspond to gaps removed from the consensus prototype are also dropped from the weightings array. Table IV gives an example weightings array for the search request consensus prototype.

$$d_{rel}(p, r) = 1 - \frac{s(p, r) - s_{min}(p)}{s_{max}(p)} \quad (5)$$

where $s_{max}$ is the maximum possible alignment score for the given consensus prototype and $s_{min}$ is the minimum possible alignment score for the given consensus prototype. These are calculated in equations 6 and 7, respectively,

TABLE 9

Example weightings for Search consensus prototype from MSA Profile
(using equation 3, with b = 1 and c = 10)

| P | { | i | d | : | ? | ? | ? | , | o | p | : | S | , | s | n | : | ? | ? | ? | ? | ? | ? | ? | } |
|---|---|---|---|---|---|---|---|---|---|---|---|---|---|---|---|---|---|---|---|---|---|---|---|---|
| E | 0 | 0 | 0 | 0 | 1.05 | 1.33 | 1.33 | 0 | 0 | 0 | 0 | 0 | 0 | 0 | 0 | 0 | 1.61 | 1.61 | 0.95 | 1.33 | 1.33 | 1.05 | 1.33 | 0 |
| w | 1 | 1 | 1 | 1 | $\frac{1}{1342}$ | $\frac{1}{4760}$ | $\frac{1}{4760}$ | 1 | 1 | 1 | 1 | 1 | 1 | 1 | 1 | 1 | $\frac{1}{14638}$ | $\frac{1}{14638}$ | $\frac{1}{796}$ | $\frac{1}{4760}$ | $\frac{1}{4760}$ | $\frac{1}{1342}$ | $\frac{1}{4760}$ | 1 |

Referring again to FIG. 6, at runtime, the formulated consensus request message prototypes are used to match incoming requests from the system under test by calculating a similarity thereto at block 615. Referring now to FIG. 12, to determine similarity, the incoming request is compared to the cluster prototypes using a distance function at block 1200. In particular embodiments, a modified Needleman-Wunsch algorithm is used to calculate the matching distance between an incoming request and the consensus request message prototype for each operation type (or cluster). The modifications to the Needleman-Wunsch algorithm include matching the wildcards and applying the entropy weights calculated at block 1115 of FIG. 11. For example, when a character from the incoming request is aligned with a wildcard character in the prototype, the alignment is given a score that is different to an identical match or a non-match (i.e. a difference), as given in equation 4, $$S(p_i, r_j) = \begin{cases} w_i M & \text{if } p_i = r_j \wedge p_i \neq ? \\ w_i D & \text{if } p_i \neq r_j \wedge p_i \neq ? \\ w_i X & \text{if } p_i = ? \end{cases} \quad (4)$$

where $p_i$ is the ith character in the consensus prototype, $r_j$ is the jth character in the incoming message, $w_i$ is the weighting for the ith column, M and D are constants denoting the Needleman-Wunsch identical score and difference penalty, respectively, and X is the wildcard matching constant.

Figure 12:
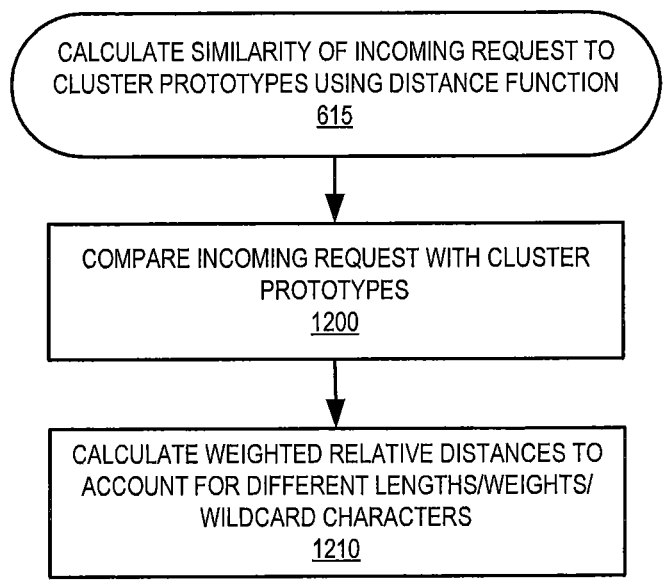

Still referring to FIG. 12, a global alignment between each consensus request message prototype and incoming request is made by applying the modified scoring equation 4 to the Needleman-Wunsch algorithm, giving an absolute alignment score, s. The relative distance, denoted as $d_{rel}$, is calculated from the absolute alignment score to normalize for consensus prototypes of different lengths, different entropy weights, and different numbers of wildcards at block 1210. The relative distance is in the range 0 to 1, inclusive, where 0 signifies the best possible match with the consensus, and 1 represents the furthest possible distance. The relative distance $d_{rel}$ is calculated according to equation 5, $$s_{max}(p) = \sum_{i=1}^{|p|} S(p_i, p_i) \quad (6)$$

$$s_{min}(p) = \sum_{i=1}^{|p|} S(p_i, \varnothing) \quad (7)$$

where ∅ is a symbol different to all of the characters in the consensus prototype.

Referring again to FIG. 6, based on the above calculations, the consensus prototype having the least distance to the incoming message is identified as the matching prototype, therefore identifying the matching message cluster at block 620.

As an example, suppose an incoming add request is received, having the byte sequence {id:37,op:A,sn:Durand}. Comparing the incoming request against the search consensus prototype yields the alignment:

request: {id:3*7,op:A,sn:*Durand}
prototype: {id:???,op:S,sn:???????}

Using equation 5, the weighted relative distance is calculated to be 0.0715. Comparing against the add consensus prototype produces the alignment below with a relative distance of 0.068.

request: {id:37,op:A,sn:******D*u*r*an*d***}
prototype: {id:????,op:A,sn:????????????1????????}

Consequently, the add prototype is selected as the matching prototype.

A customized response for the incoming request is generated and transmitted to the system under test 105 by selecting a representative request message from the identified message cluster at block 624, and performing dynamic substitutions using the corresponding response message. In particular, at block 625, symmetric field(s) are identified in both the request and response messages of the selected transaction. The symmetric fields refer to character sequences which occur in both the request and response messages of the chosen transaction. These symmetric fields are substituted with the corresponding characters from the incoming request at block 630 to generate the response, which is transmitted to the system under test 105 at block 635.

In some embodiments, symmetric field substitution may be performed using a response from the centroid transaction of the selected cluster. In the examples discussed above, the centroid transaction from the add cluster is selected, which includes one symmetric field (boxed below):

request: {id: 24, op: A, sn: Schneider, mobile: 123456}
response: {id: 24, op: AddRsp, result: Ok}

After performing the symmetric field substitution, the final generated response is:
{id:37,op:AddRsp,result:Ok}

Some embodiments of the present disclosure were implemented using Java, following the operations in the previous sections and the architecture of FIG. 9. For the MSA step, the ClustalW implementation of the BioJava library was used.

In specific examples discussed below, three characteristics were assessed: accuracy, efficiency and robustness. These characteristics were assessed in light of the following questions:
1. RQ1 (Accuracy): Having consensus request message prototypes formulated at the pre-processing stage, are the generated responses accurate and protocol-conformant? At runtime, can positional weighting-based matching further improve the accuracy of our approach for generating such responses?
2. RQ2 (Efficiency): Are the responses generated sufficiently timely, even for a large interaction library?
3. RQ3 (Robustness): Given non-homogeneous clusters, which may contain some messages of operation types from that of all the other messages, are the response generation techniques sufficiently robust to generate accurate responses?

The specific examples are discussed below with reference to six message trace datasets of four case study protocols, in which the accuracy, efficiency, and robustness of each was assessed and compared to previous techniques.

The examples below are directed to four real-world protocols, IMS (IP Multimedia Subsystem; a binary mainframe protocol), LDAP (Lightweight Directory Access Protocol; a binary directory service protocol), SOAP (Simple Object Access Protocol; a textual protocol, with an Enterprise Resource Planning (ERP) system messaging system services), and RESTful Twitter (a Java Script Object Notation protocol for the Twitter social media service).

One message trace dataset was used for each of these protocols. In addition, LDAP had two additional datasets: a dataset with textual representation converted from the binary dataset (denoted by LDAP text (1)), and another textual dataset that was used in related work (LDAP text (2)).

These protocols were chosen, for example, based on: (i) the wide use of the protocols in enterprise environments; (ii) the use of some (LDAP text (2) and SOAP) in the evaluation of our related work; (iii) to provide a mix of text-based protocols (SOAP and RESTful Twitter) and binary protocols (IMS and LDAP); (iv) the use of fixed length, length encoding or delimiters to structure protocol messages (given a protocol message, length fields or delimiters are used to convert its structure into a sequence of bytes that can be transmitted over the wire, where a length field is a number of bytes that show the length of another field, while a delimiter is a byte (or byte sequence) with a known value that indicates the end of a field); and (v) the inclusion of a diverse number of operation types, as indicated by the Ops column. The number of request-response interactions for each test case is shown as column Transactions in Table 10.

TABLE 10

Experiment protocol message trace datasets

| Protocol | Binary/Text | Fields | #Ops. | #Transactions |
|---|---|---|---|---|
| IMS | binary | fixed length | 5 | 800 |
| LDAP | binary | length-encoded | 10 | 2177 |
| LDAP text (1) | text | delimited | 10 | 2177 |
| LDAP text (2) | text | delimited | 6 | 1000 |
| SOAP | text | delimited | 6 | 1000 |
| Twitter (REST) | text | delimited | 6 | 1825 |

Cross-validation is a model validation method for assessing how accurately a predictive model will perform in practice. For the purpose of evaluation, the 10-fold cross-validation approach (illustrated in FIG. 7) was applied to the six case study datasets.

In particular, with reference to FIG. 7, each of the original interaction datasets 730 were randomly partitioned into 10 groups 735. Of these 10 groups, Group i 735$i$ is considered to be the evaluation group, and the remaining 9 groups define the training set. The cross-validation process was repeated 10 times (the same as the number of groups), so that each of the 10 groups 730 was used as the evaluation group 735$i$ once. When running each experiment with each trace dataset 730, embodiments of the present disclosure were applied to each request message in the evaluation group 735$i$, referred to as the incoming request, and a response was generated by the emulator 715. The time required to generate the response for each incoming request was recorded and used to evaluate the runtime efficiency of the consensus+ weighting approach compared to other approaches. Having generated a response for each incoming request, five criteria were utilized to determine its accuracy, thereby evaluating the ability of embodiments of the present disclosure to generate protocol-conformant responses. These five criteria are explained as follows using an example shown in Table 11.

TABLE 11

Examples for accuracy criteria: (i) Identical, (ii) Consistent, (iii) Protocol conformant, (iv) Well-formed, (v) Malformed.

| (i) | Expected | {id:37,op:AddRsp,result:Ok} |
|---|---|---|
|  | Generated | {id:37,op:AddRsp,result:Ok} |
| (ii) | Expected | {id:37,op:AddRsp,result:Ok} |
|  | Generated | {id:37,op:AddRsp,result:AlreadyExists} |
| (iii) | Expected | {id:37,op:AddRsp,result:OK} |
|  | Generated | {id:15,op:AddRsp,result:AlreadyExists} |
| (iv) | Expected | {id:37,op:AddRsp,result:Ok) |
|  | Generated | {id:15,op:SearchRsp,result:Ok,gn:Miao,sn:Du} |
| (v) | Expected | {id:37,op:AddRsp,result:Ok) |
|  | Generated | {id:15,op:AearchRsp,result:Ok,gn:Miao,sn:Du} |

Consider the incoming request {id:37,op:A,sn:Durand} with the associated response {id:37,op:AddRsp,result:Ok} in the transaction library. The emulated response is considered to be:
1. Identical if its character sequence is identical to the recorded (or expected) response (Example (i) in Table 11);
2. Consistent if it is of the expected operation type and has the critical fields in the payload replicated (Example (ii) in Table 11 where id is identical, but some of the other payload differs);

3. Protocol conformant if its operation type corresponds to the expected response, but it differs in some payload information (Example (iii) in Table 11 where both the id and result tags differ);
4. Well-formed if it is structured correctly (that is, it corresponds to one of the valid response messages), but has the wrong operation type (Example (iv) in Table 11 where the generated response is of a valid structure, but its operation type op:SearchRsp does not match the expected operation type op:AddRsp); and
5. Malformed if it does not meet any of the above criteria (Example (v) in Table 11 where operation type op:AearchRsp in the generated response is invalid).

A generated response was further considered to be valid if it met one of the first three criteria, that is, identical, consistent or protocol conformant. Otherwise, a generated response was considered to be invalid.

Embodiments of the present disclosure as described herein with reference to FIGS. 9-12 generate application layer responses directly from trace messages, and are compared below with Whole Library and Cluster Centroid approaches. Given an incoming request, the Whole Library approach searches the entire transaction library for its closest matching request to synthesize its response(s). This approach is effective in producing accurate responses. Experimental results revealed that more than 90% of generated responses were accurate, which met the first three criteria above (that is, identical, consistent or protocol conformant). However, it is generally too slow for real-time use.

The Cluster Centroid approach reduces the number of searches to the number of transaction library clusters. Therefore, it can generate responses for real time use, but with less accuracy. These two approaches are used as baselines to evaluate the techniques of FIGS. 9-12.

The accuracy (RQ1) evaluation was conducted to assess the capability of embodiments of the present disclosure for generating accurate responses. As discussed with reference to FIGS. 9-12, embodiments of the present disclosure include at least two features aimed at enhancing response accuracy, in particular, the generation of a consensus request message prototype, combined with entropy-weighted distance calculation at runtime. To measure the impact of these techniques, two separate sets of experiments in accordance with embodiments of the present disclosure were conducted, which are referred to as Consensus-Only and Consensus+Weighting, respectively. In addition, both sets of experiments tested for the best pre-defined frequency threshold f, trying three different values. As illustrated in Equation 1, a pre-defined frequency threshold may be required to calculate the consensus sequence prototype. In the below experiments, three of the most popular threshold values (0.5, 0.8 and 1) were selected.

Table 12 summarizes the evaluation results of Consensus Only, Consensus+Weighting, Whole Library, and Cluster Centroid experiments for the six test datasets. The Accuracy Ratio column is calculated by dividing the number of valid generated responses by the total number of interactions tested. The last five columns give a more detailed breakdown of the different categories of valid and invalid responses generated.

TABLE 12

Evaluation Results of Applying Consensus Sequence Prototype

| Protocol | Method | | Accuracy Ratio | No. | Valid | | | Invalid | |
|---|---|---|---|---|---|---|---|---|---|
| | | | | | Identical | Consistent | Conformant | Well-formed | Malformed |
| IMS | Whole Library | | 75.25% | 800 | 400 | 202 | 0 | 198 | 0 |
| (binary) | Cluster Centroid | | 97.88% | | 400 | 383 | 0 | 17 | 0 |
| | Consensus | f = 0.5 | 100% | | 400 | 400 | 0 | 0 | 0 |
| | Only | f = 0.8 | 100% | | 400 | 400 | 0 | 0 | 0 |
| | | f = 1 | 100% | | 400 | 400 | 0 | 0 | 0 |
| | Consensus + | f = 0.5 | 100% | | 400 | 400 | 0 | 0 | 0 |
| | Weighting | f = 0.8 | 100% | | 400 | 400 | 0 | 0 | 0 |
| | | f = 1 | 100% | | 400 | 400 | 0 | 0 | 0 |
| LDAP | Whole Library | | 94.12% | 2177 | 248 | 17 | 1784 | 36 | 92 |
| (binary) | Cluster Centroid | | 91.59% | | 263 | 17 | 1714 | 183 | 0 |
| | Consensus | f = 0.5 | 87.74% | | 268 | 14 | 1628 | 267 | 0 |
| | Only | f = 0.8 | 84.66% | | 264 | 14 | 1565 | 334 | 0 |
| | | f = 1 | 79.97% | | 259 | 14 | 1468 | 436 | 0 |
| | Consensus + | f = 0.5 | 98.71% | | 278 | 18 | 1853 | 28 | 0 |
| | Weighting | f = 0.8 | 99.95% | | 278 | 18 | 1880 | 1 | 0 |
| | | f = 1 | 86.90% | | 267 | 16 | 1609 | 285 | 0 |
| LDAP | Whole Library | | 100% | 2177 | 1648 | 415 | 114 | 0 | 0 |
| text | Cluster Centroid | | 100% | | 811 | 1325 | 41 | 0 | 0 |
| (1) | Consensus | f = 0.5 | 100% | | 1555 | 622 | 0 | 0 | 0 |
| (text) | Only | f = 0.8 | 100% | | 1555 | 622 | 0 | 0 | 0 |
| | | f = 1 | 100% | | 1527 | 650 | 0 | 0 | 0 |
| | Consensus + | f = 0.5 | 100% | | 1559 | 618 | 0 | 0 | 0 |
| | Weighting | f = 0.8 | 100% | | 1559 | 618 | 0 | 0 | 0 |
| | | f = 1 | 100% | | 1559 | 618 | 0 | 0 | 0 |
| LDAP | Whole Library | | 92.9% | 1000 | 927 | 2 | 0 | 71 | 0 |
| text | Cluster Centroid | | 73.4% | | 509 | 225 | 0 | 252 | 14 |
| (2) | Consensus | f = 0.5 | 100% | | 808 | 192 | 0 | 0 | 0 |
| (text) | Only | f = 0.8 | 100% | | 808 | 192 | 0 | 0 | 0 |
| | | f = 1 | 100% | | 808 | 192 | 0 | 0 | 0 |
| | Consensus + | f = 0.5 | 100% | | 808 | 192 | 0 | 0 | 0 |
| | Weighting | f = 0.8 | 100% | | 808 | 192 | 0 | 0 | 0 |
| | | f = 1 | 100% | | 808 | 192 | 0 | 0 | 0 |

TABLE 12-continued

Evaluation Results of Applying Consensus Sequence Prototype

| Protocol | Method | | Accuracy Ratio | No. | Valid | | | Invalid | |
|---|---|---|---|---|---|---|---|---|---|
| | | | | | Identical | Consistent | Conformant | Well-formed | Malformed |
| SOAP (text) | Whole Library | | 100% | 1000 | 77 | 923 | 0 | 0 | 0 |
| | Cluster Centroid | | 100% | | 98 | 902 | 0 | 0 | 0 |
| | Consensus Only | f = 0.5 | 100% | | 96 | 904 | 0 | 0 | 0 |
| | | f = 0.8 | 100% | | 96 | 904 | 0 | 0 | 0 |
| | | f = 1 | 100% | | 96 | 904 | 0 | 0 | 0 |
| | Consensus + Weighting | f = 0.5 | 100% | | 96 | 904 | 0 | 0 | 0 |
| | | f = 0.8 | 100% | | 96 | 904 | 0 | 0 | 0 |
| | | f = 1 | 100% | | 96 | 904 | 0 | 0 | 0 |
| Twitter (REST) (text) | Whole Library | | 99.56% | 1825 | 150 | 994 | 673 | 7 | 1 |
| | Cluster Centroid | | 99.34% | | 0 | 896 | 917 | 11 | 1 |
| | Consensus Only | f = 0.5 | 99.34% | | 0 | 893 | 920 | 11 | 1 |
| | | f = 0.8 | 99.34% | | 0 | 893 | 920 | 11 | 1 |
| | | f = 1 | 99.34% | | 0 | 893 | 920 | 11 | 1 |
| | Consensus + Weighting | f = 0.5 | 99.34% | | 0 | 893 | 920 | 11 | 1 |
| | | f = 0.8 | 99.34% | | 0 | 893 | 920 | 11 | 1 |
| | | f = 1 | 99.34% | | 0 | 893 | 920 | 11 | 1 |

Table 12 shows that the combined Consensus+Weighting approach achieves the highest accuracy overall for the datasets tested. The combined approach can achieve up to 100% accuracy for four of the datasets, and up to 99.95% and 99.34% for the remaining two data sets (LDAP binary and Twitter, respectively). In the Twitter case, the Whole Library approach may be marginally more accurate.

With respect to the impact for the frequency threshold f, the results show that allowing some tolerance (i.e., f<1) in the multiple sequence alignment can yield improved accuracy. For the LDAP (binary) dataset, the thresholds of f=0.5 and f=0.8 produced higher accuracy than f=1. For the other datasets, the threshold had no impact on the accuracy. As such, the results may not be sensitive to the value of the threshold for most scenarios.

As shown in Table 12, the Consensus+Weighting approach has a higher accuracy than the Whole Library approach, even though the latter uses all the available data points from the trace library (for three of the datasets, Consensus+Weighting is more accurate; for two of the datasets it has the same accuracy; for one of the datasets, it is slightly lower). A reason for the higher accuracy is that the Consensus+Weighting abstracts away the message payload information sections (using wildcards), and may thus be less susceptible to matching a request to the wrong operation type but with the right payload information, whereas the Whole Library approach may be susceptible to this type of error (note the well-formed but invalid responses for the Whole Library approach in Table 12).

The impact of the entropy weightings can be observed for the LDAP binary dataset. For this test, the weightings improve the accuracy results. For the other datasets, no impact from the weightings can be observed, as the consensus sequence prototype by itself (Consensus Only) can provide up to 99-100% accuracy.

In evaluating efficiency (RQ2), Table 13a compares the average response generation time of the Consensus+Weighting approach with the Whole Library and Cluster Centroid approaches. The times represent the average times spent generating requests, for all the requests in the datasets sets. In addition, Table 13a lists the average response times of the actual services from which the original traces were recorded. To provide better insight into the runtime performance, matching time (M) and substitution time (S) in milliseconds (ms) were separately measured, results of which are presented in Table 13b.

TABLE 13a

Average Total Response Generation Time (ms)

| | No. | Whole Library | Cluster Centroid | Consensus + Weighting | Real System |
|---|---|---|---|---|---|
| IMS | 800 | 470.99 | 4.94 | 3.24 | 518 |
| LDAP | 2177 | 835.91 | 2.77 | 2.88 | 28 |
| LDAP text(1) | 2177 | 1434.70 | 5.69 | 7.30 | 28 |
| LDAP text(2) | 1000 | 266.30 | 2.44 | 1.63 | 28 |
| SOAP | 1000 | 380.24 | 2.97 | 3.35 | 65 |
| Twitter | 1825 | 464.09 | 32.86 | 36.62 | 417 |

TABLE 13b

Average Matching Time and Average Substitution Time (ms)

| | | Whole Library | | Cluster Centroid | | Consensus + Weighting | |
|---|---|---|---|---|---|---|---|
| | No. | M | S | M | S | M | S |
| IMS | 800 | 460.78 | 10.2 | 3.67 | 1.27 | 2.68 | 0.56 |
| LDAP | 2177 | 828.95 | 6.96 | 2.38 | 0.39 | 2.60 | 0.28 |
| LDAP text(1) | 2177 | 1425.23 | 9.47 | 4.38 | 1.31 | 5.67 | 1.63 |
| LDAP text(2) | 1000 | 257.92 | 8.38 | 1.35 | 1.09 | 1.14 | 0.49 |
| SOAP | 1000 | 372.58 | 7.66 | 1.92 | 1.05 | 2.45 | 0.9 |
| Twitter | 1825 | 412.98 | 51.11 | 1.47 | 31.39 | 1.67 | 34.95 |

The results of Tables 13a-13b show that the Consensus+Weighting approach is more efficient at generating responses, much faster than the actual services being emulated. The response generation time is comparable to the Cluster Centroid approach, being faster for some datasets, slower for others. Both of these approaches are about two orders of magnitude faster than the Whole Library approach. However, whereas the Cluster Centroid approach trades off accuracy for speed, the Consensus+Weighting had a high accuracy at a similar speed.

Comparing the matching time versus the substitution time (shown in Table 13b), the Whole Library approach consumes most of its time during the matching process (as it involves a Needleman-Wunsch alignment with every request in the transaction library). Consensus+Weighting and Cluster Centroid have reduced matching times. Twitter has long substitution times, such that for the fast approaches, most time is spent performing the substitution. This may be due to the Twitter responses being relatively long, causing the symmetric field identification (common substring search) to become more time consuming.

The Consensus+Weighting approach in accordance with embodiments of the present disclosure generates responses faster than the actual services being emulated. This may be advantageous in supporting testing of an enterprise system under test under realistic performance conditions (delays can be added to slow down the emulated response, but not the other way around). One limitation of the Whole Library approach is that, for faster services (such as LDAP), it may not be able to generate responses in a time which matches the actual services.

The robustness (RQ3) of the Consensus+Weighting approach in accordance with embodiments of the present disclosure in generating accurate responses is evaluated in the case where the clustering process described above is imperfect. In particular, noise was deliberately injected into the clusters, that is, to create clusters where a fraction of the interaction messages are of different operation types. The noise ratios tested were 5%, 10% and 20%. The experiments were repeated with different frequency thresholds (i.e. 0.5, 0.8, and 1).

Table 14 summarizes the experimental results, which show that having a frequency threshold f below 1 may have a relatively large impact on preserving the accuracy when the clustering is noisy. A threshold of f=0.5 results in the best accuracy in Table 14. When using this threshold, the accuracy can be maintained above 97% for all datasets when the noise ratio is 5%. As the noise ratio increases to 20%, the accuracy decreases for binary LDAP, but may remain relatively high for the other datasets.

of different protocols; however, actual system interactions may be more complicated than those of the above datasets.

As described in detail above, embodiments of the present disclosure allow for automatically generation of service responses from message traces, in a manner that is independent of and requires no prior knowledge of message structure or decoders or message schemas. In particular, the use of multiple sequence alignment to automatically generate consensus prototypes for the purpose of matching incoming request messages, as described herein, may be accurate, efficient and robust. The use of wildcard characters in the prototypes allow stable and unstable parts of the request messages for the various operation types to be separated.

Rather than using the prototypes directly for strict matching (such as using it as a regular expression), particular embodiments of the present disclosure calculate matching distance using a modified Needleman-Wunsch alignment algorithm. In identifying the closest matching prototype, embodiments of the present disclosure are robust even if the prototypes are imperfect. Moreover embodiments of the present disclosure can match requests which are slightly different to the prototypes, and/or are of different length to the prototypes, to handle incoming requests that may be outside of the traces that were directly observed in the trace recordings. Weighting sections of the prototype with different importance based on entropy further improves the matching accuracy.

Experimental results using the six message trace datasets described above demonstrate the ability to automatically generate accurate responses in real time for most cases, including from imperfect message clusters that may contain messages of different operation types. While the generated responses may lack diversity, further embodiments may identify common patterns of all responses in a cluster, for example, by applying multiple sequence alignment to the

TABLE 14

Response Accuracy for Clusters with Noisy Data

| | 5% Noise Consensus + Weighting | | | 10% Noise Consensus + Weighting | | | 20% Noise Consensus + Weighting | | |
|---|---|---|---|---|---|---|---|---|---|
| | f = 0.5 | f = 0.8 | f = 1 | f = 0.5 | f = 0.8 | f = 1 | f = 0.5 | f = 0.8 | f = 1 |
| IMS | 99.38% | 99.75% | 72.25% | 95.75% | 98.63% | 68.5% | 99.75% | 96.5% | 68.13% |
| LDAP | 97.01% | 97.29% | 33.49% | 87.09% | 79.83% | 49.93% | 73.81% | 63.67% | 42.03% |
| LDAP text (1) | 100% | 100% | 83.74% | 100% | 100% | 84.20% | 100% | 100% | 86.50% |
| LDAP text (2) | 100% | 100% | 100% | 100% | 100% | 100% | 100% | 100% | 100% |
| SOAP | 98.2% | 98.2% | 91.5% | 100% | 100% | 98.2% | 100% | 100% | 97.7% |
| Twitter (REST) | 99.34% | 99.34% | 22.41% | 97.59% | 95.01% | 32.60% | 96.71% | 94.13% | 29.00% |

Table 14 thus illustrates that embodiments of the present disclosure can provide accurate response generation with a tolerance for a relatively small amount of noise in the clusters. A noise ratio of 20% is considered very high. However, clustering processes performed in accordance with embodiments of the present disclosure were capable of producing perfect separation (i.e., 0% noise) of interaction messages by operation type for the six datasets tested.

It will be understood that the above experimental results were achieved based on on six datasets from four particular protocols, and thus, may not be representative of results for other message protocols, given the diversity in message protocols. In addition, the datasets discussed above were obtained by randomly generating client requests for services response messages to distinguish stable positions from variable positions. Accordingly, further embodiments of the symmetric field techniques described herein may provide that only characters sequences occurring in both the recorded request and variable positions of the recorded response may be substituted with characters from the incoming request. This may also improve the efficiency of the substitution for longer messages. To further improve robustness with respect to noisy clustering, further embodiments may utilize outlier detection techniques to remove outliers of clusters, before applying the alignment operations described herein.

Embodiments of the present disclosure thus provide methods and systems for automatically generating realistic response messages from network traces for enterprise system emulation environments with improved accuracy and efficiency. Particular embodiments may use a bioinformatics-inspired multiple sequence alignment algorithm to derive message prototypes, adding wildcards for high variability sections of messages. A modified Needleman-Wunsch algorithm can be used to calculate message distance and entropy weightings for increased accuracy. Embodiments of the present disclosure thus automatically separate the payload and structural information in complex enterprise system messages, in a highly robust manner. Experimental data indicates a greater than 99% accuracy for the four protocols tested, as well as efficient emulated service response performance, enabling scaling within an emulated deployment environment.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of service emulation, the method comprising:
   recording a plurality of messages communicated between a system under test and a target system for emulation in a computer-readable memory;
   clustering ones of the recorded plurality of messages to define a plurality of message clusters;
   generating respective cluster prototypes for the plurality of message clusters with respect to the plurality of message clusters, the respective cluster prototypes comprising a commonality among the ones of the recorded plurality of messages of the corresponding message clusters, wherein the generating the respective cluster prototypes comprises:
      aligning the ones of the recorded plurality of messages of the corresponding message clusters according to respective positions of the ones of the recorded plurality of messages of the corresponding message clusters;
      identifying common characters based on a frequency of occurrence at the respective positions indicated by the aligning; and
      extracting a sequence comprising the common characters from the ones of the messages of the corresponding message clusters responsive to the aligning, wherein extracting the sequence comprises:
         determining a lack of consensus based on the frequency of occurrence at the respective positions; and
         inserting wildcard characters into the sequence responsive to determining the lack of consensus;
   automatically identifying one of the message clusters as corresponding to a request from the system under test based on a comparison of the request with the respective cluster prototypes; and
   automatically generating a response to the request for transmission to the system under test based on the one of the message clusters that was identified and transmitting the response to the system under test,
   wherein the recording, the clustering, the generating the respective cluster prototypes, the identifying, and the generating the response comprise operations performed by a processor coupled to the memory.

2. The method of claim 1, wherein, for the respective cluster prototypes, the commonality comprises common characters that are selected based on a frequency of occurrence at respective positions of the ones of the messages of the corresponding message clusters.

3. The method of claim 2, wherein:
   the aligning further comprises inserting gap characters among the ones of the messages of the corresponding message clusters to align the common characters at the respective positions.

4. The method of claim 1, wherein for the respective cluster prototypes, the extracting the sequence further comprises:
   inserting the common characters into the sequence based on the frequency of occurrence at the respective positions being above a threshold; and
   inserting the wildcard characters into the sequence based on the frequency of occurrence at the respective positions being below the threshold.

5. The method of claim 4, wherein the sequence comprising the common characters further comprises ones of the gap characters, and wherein for the respective cluster prototypes, the extracting the sequence further comprises:
   deleting the ones of the gap characters from the sequence.

6. The method of claim 1, further comprising:
   identifying respective positions of the respective cluster prototypes as corresponding to respective information types based on a relative variability of the respective positions of the ones of the messages of the corresponding message clusters; and assigning different weightings to the respective positions of the respective cluster prototypes according to the respective information types.

7. The method of claim 6, wherein ones of the respective positions of the respective cluster prototypes having a lower relative variability are assigned higher ones of the different weightings.

8. The method of claim 6, wherein the identifying the one of the message clusters as corresponding to the request from the system under test comprises:

calculating a similarity of the request to the respective cluster prototypes based on the different weightings assigned to the respective positions thereof and a runtime distance measure that is independent of a message structure of the request; and identifying the one of the message clusters as corresponding to the request based on the similarity of the request to a corresponding one of the cluster prototypes.

9. The method of claim 7, wherein the runtime distance measure is normalized to account for alignment of respective positions of the request with the wildcard characters in the respective cluster prototypes.

10. The method of claim 7, wherein the ones of the messages of the message clusters comprise respective requests and responses associated therewith communicated between the system under test and the target system, and wherein generating the response comprises:

selecting one of the requests of the one of the message clusters that was identified;

identifying respective fields in the one of the requests and in one of the responses associated therewith as comprising a common subsequence; and populating a field in the one of the responses with a subsequence from the request from the system under test based on the respective fields that were identified.

11. A computer system, comprising:

a processor; and a memory coupled to the processor, the memory comprising computer readable program code embodied therein that, when executed by the processor, causes the processor to:

record a plurality of messages communicated between a system under test and a target system for emulation in a computer-readable memory;

cluster ones of the plurality of messages to define a plurality of message clusters;

generate respective cluster prototypes for the plurality of message clusters with respect to the plurality of message clusters, the respective cluster prototypes comprising a commonality among the ones of the plurality of messages of the corresponding message clusters wherein, to generate the respective cluster prototypes, the computer readable program code, when executed by the processor, further causes the processor to:

align the ones of the messages of the corresponding message clusters according to respective positions of the ones of the recorded plurality of messages of the corresponding message clusters;

identify common characters based on the frequency of occurrence at the respective positions indicated by alignment thereof; and extract a sequence comprising the common characters from the ones of the messages of the corresponding message clusters responsive to the aligning, wherein to extract the sequence, the computer readable program code, when executed by the processor, further causes the processor to:

determine a lack of consensus based on the frequency of occurrence at the respective positions; and insert wildcard characters into the sequence responsive to determining the lack of consensus;

automatically identify one of the message clusters as corresponding to a request from the system under test based on a comparison of the request with the respective cluster prototypes; and automatically generate a response to the request for transmission to the system under test based on the one of the message clusters that was identified and to transmit the response to the system under test.

12. The computer system of claim 11, wherein, for the respective cluster prototypes, the commonality comprises common characters that are selected based on a frequency of occurrence at respective positions of the ones of the messages of the corresponding message clusters.

13. The computer system of claim 11, wherein:

to align the ones of the messages, the computer readable program code, when executed by the processor, further causes the processor to insert gap characters among the ones of the messages of the corresponding message clusters to align the common characters at the respective positions; and to generate the respective cluster prototypes, the computer readable program code, when executed by the processor, further causes the processor to extract a sequence comprising the common characters from the ones of the messages of the corresponding message clusters responsive to the alignment thereof.

14. The computer system of claim 11, wherein, to extract the sequence for the respective cluster prototypes, the computer readable program code, when executed by the processor, further causes the processor to:

insert the common characters into the sequence based on the frequency of occurrence at the respective positions being above a threshold; and insert the wildcard characters into the sequence based on the frequency of occurrence at the respective positions being below the threshold.

15. The computer system of claim 13, wherein the sequence comprising the common characters further comprises ones of the gap characters, and wherein, to extract the sequence for the respective cluster prototypes, the computer readable program code, when executed by the processor, further causes the processor to:

delete the ones of the gap characters from the sequence.

16. A computer program product comprising:

a non-transitory computer readable storage medium having computer readable program code embodied in the medium, the computer readable program code comprising:

computer readable code to record a plurality of messages communicated between a system under test and a target system for emulation in a computer-readable memory;

computer readable code to cluster ones of the plurality of messages to define a plurality of message clusters;

computer readable code to generate respective cluster prototypes for the plurality of message clusters with respect to the plurality of message clusters, the respective cluster prototypes comprising a commonality among the ones of the plurality of messages of the corresponding message clusters;

computer readable code to automatically identify one of the plurality of message clusters as corresponding to a request from the system under test based on a comparison of the request with the respective cluster prototypes; and computer readable code to automatically generate a response to the request for transmission to the system under test based on the one of the message clusters that was identified and to transmit the response to the system under test, wherein the computer readable code to generate respective cluster prototypes comprises computer readable code to:

align the ones of the messages of the corresponding message clusters according to respective positions of the ones of the recorded plurality of messages of the corresponding message clusters;

identify common characters based on the frequency of occurrence at the respective positions indicated by the aligning; and extract a sequence comprising the common characters from the ones of the messages of the corresponding message clusters responsive to the aligning by determining a lack of consensus based on the frequency of occurrence at the respective positions and inserting wildcard characters into the sequence responsive to determining the lack of consensus.

* * * * *